(12) United States Patent
Hofmann et al.

(10) Patent No.: US 9,816,880 B2
(45) Date of Patent: Nov. 14, 2017

(54) DEVICE HAVING A MEASURING APPARATUS FOR MEASURING FORCES AND/OR LOADS

(71) Applicant: ZF Friedrichshafen AG, Friedrichshafen (DE)

(72) Inventors: Peter Hofmann, Gauting (DE); Frank Nachbar, Osnabruck (DE); Rainer Haevescher, Stemwede (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 205 days.

(21) Appl. No.: 14/365,354

(22) PCT Filed: Nov. 20, 2012

(86) PCT No.: PCT/EP2012/073053
§ 371 (c)(1),
(2) Date: Jun. 13, 2014

(87) PCT Pub. No.: WO2013/092068
PCT Pub. Date: Jun. 27, 2013

(65) Prior Publication Data
US 2015/0006054 A1    Jan. 1, 2015

(30) Foreign Application Priority Data
Dec. 22, 2011  (DE) .......................... 10 2011 089 605

(51) Int. Cl.
*G01L 1/12* (2006.01)
*G01L 1/25* (2006.01)
(Continued)

(52) U.S. Cl.
CPC ................ *G01L 1/12* (2013.01); *B60G 7/001* (2013.01); *B60G 17/019* (2013.01); *B60T 8/17* (2013.01);
(Continued)

(58) Field of Classification Search
CPC ......................................................... G01L 1/12
See application file for complete search history.

(56) References Cited

U.S. PATENT DOCUMENTS

| 5,010,299 A | 4/1991 | Nishizawa et al. |
| 2008/0034881 A1* | 2/2008 | Haase .................. G01L 1/2287 73/768 |

(Continued)

FOREIGN PATENT DOCUMENTS

| DE | 690 03 141 T2 | 1/1994 |
| DE | 10 2008 001 006 A1 | 11/2009 |

(Continued)

OTHER PUBLICATIONS

German Search Report Corresponding to 10 2011 089 605.8 dated Feb. 19, 2013.

(Continued)

*Primary Examiner* — Imran Mustafa
(74) *Attorney, Agent, or Firm* — Davis & Bujold, PLLC; Michael J. Bujold

(57) ABSTRACT

A component of a machine. The component has a measuring fixture for measuring forces and at least one metallic, magnetic portion. The measuring fixture includes at least one field-generating member for producing an electromagnetic alternating field and at least one detection member for detecting changes of the magnetic field produced. The field-generating member and the detection members are arranged on the metallic, magnetic portion and are designed to interact with the metallic, magnetic portion in such manner that by way of the measuring fixture, as a function of measurement signals from the detection member, forces acting on and/or deformations of the component can be detected.

12 Claims, 24 Drawing Sheets

(51) Int. Cl.
*B60G 7/00* (2006.01)
*B60G 17/019* (2006.01)
*B60T 8/17* (2006.01)
*F03D 17/00* (2016.01)

(52) U.S. Cl.
CPC .............. *F03D 17/00* (2016.05); *G01L 1/127* (2013.01); *B60G 2204/1162* (2013.01); *B60G 2206/11* (2013.01); *B60G 2400/94* (2013.01); *B60G 2401/17* (2013.01); *B60G 2600/22* (2013.01)

(56) References Cited

U.S. PATENT DOCUMENTS

2009/0319212 A1* 12/2009 Cech .................. B60R 21/0136
702/65
2010/0222960 A1* 9/2010 Oida .................. B60G 17/0195
701/31.4

FOREIGN PATENT DOCUMENTS

| IT | WO 03016891 A2 * | 2/2003 | ............... G01B 7/24 |
| WO | 03/016891 A2 | 2/2003 | |

OTHER PUBLICATIONS

International Search Report Corresponding to PCT/EP2012/073053 dated Feb. 28, 2013.
Written Opinion Corresponding to PCT/EP2012/073053 dated Feb. 28, 2013.

* cited by examiner

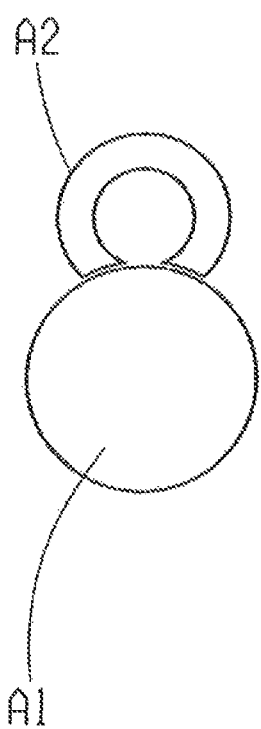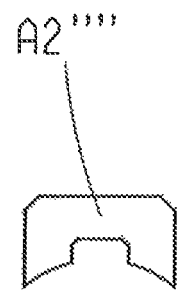
Fig. 24a
Fig. 24b

DEVICE HAVING A MEASURING APPARATUS FOR MEASURING FORCES AND/OR LOADS

This application is a National Stage completion of PCT/EP2012/073053 filed Nov. 20, 2012, which claims priority from German patent application serial no. 10 2011 089 605.8 filed Dec. 22, 2011.

FIELD OF THE INVENTION

The present invention concerns a component of a device, for example a chassis component of a (motor)-vehicle or a rotor component of a wind power generator, which component comprises a measuring fixture for the measurement of forces, and at least one metallic, magnetic portion as described below. Furthermore, the present invention concerns a driver assistance system for a motor vehicle, as described below, as well as a diagnosis system for a device, preferably a vehicle, as described below.

BACKGROUND OF THE INVENTION

Manufacturers generally strive to provide components with as long a useful life as possible and which at the same time are simple and inexpensive to produce. To that end measurement concepts are (further) developed, by means of which the loads imposed on the components in the form of forces or torques, and deformations that result from them, are detected and the measured loads or the corresponding measurement signals are further processed and/or can be used for diagnostic purposes.

From DE 10 2008 001 006 A1, a wheel suspension system for a vehicle is known, which comprises several wheel suspension elements and wherein the deformation in at least one element of the wheel suspension is detected by means of a special measurement arrangement. For that purpose the component whose deformation should be measured has to be prepared in a special manner. For example, this is done by the application of permanent magnetization with locally different intensity, in the manner of a so-termed magnetic coding.

This has the disadvantage that a material specially suited to and prepared for this application has to be used, which material itself constitutes the component to be measured or is worked into the component as a supplementary material. A special magnetic coding of the material is very costly and makes it impossible to use the measurement process—having regard to the nature of the material—on any arbitrary materials. Moreover, a further difficulty of magnetic coding is that its long-term stability is hard or even impossible to ensure. Another disadvantage consists in that the detection and evaluation of a static magnetic field is sensitive to interfering fields in the surroundings, and conversely, so that in the automotive sector manufacturers prescribe the avoidance of static magnetic fields.

In special applications, such as chassis, it is desirable to be able to use almost any desired materials for the production of corresponding components in order to keep the production processes unchanged or at least inexpensive.

SUMMARY OF THE INVENTION

Accordingly, the purpose of the present invention is to provide a component of a device of the type mentioned at the start, which overcomes the disadvantages described in relation to the prior art and which allows the component to be designed simply and inexpensively in relation to the measuring fixture used.

This objective is achieved by virtue of a component of a device, which comprises a fixture for the measurement of forces and at least one metallic, magnetic portion. A component according to the invention is part of a driver assistance system for a vehicle as described below and of a diagnosis system for a device, in particular for a vehicle, as described below.

The component of a device according to the invention comprising a measuring fixture for measuring forces and at least one metallic, magnetic portion, is characterized in that the measuring fixture comprises at least one field-generating means for producing an alternating electromagnetic field and detection means for detecting changes of the magnetic field produced, which field-generating means and which detection means are arranged on the metallic, magnetic portion of the component and are designed to interact with it in such manner that by means of the measuring fixture forces acting on the component and/or deformations of the component can be detected as a function of measurement signals of the detection means.

The physical process for detecting forces and/or deformations of the component, and a corresponding sensor, have been developed by Polyresearch AG, Starnberg/Germany and an application for patent rights with respect to these has been filed. This process avoids the disadvantages explained above, since there is no need for permanent magnetic coding of the materials and this enables almost any desired metallic material to be used for making the component, to which an alternating electromagnetic field is applied or produced in the measurement area. Consequently, any desired metallic materials can be used, which only have to be magnetizable, at least for a short time. The detection means serve to detect changes of the alternating electromagnetic field produced by the field-generating means, which changes are brought about by mechanical loads acting on and deformations of the component. Such an alternating field has the advantage that it is insensitive to interfering fields in the surroundings and has no damaging interaction with other electronic systems of the device. The measurement method and preferred design features of the measuring fixture (sensor) are described in detail in the annex to the present application, to which reference in full is made. The corresponding text is based on a parallel, simultaneously timed patent application by Polyresearch AG.

According to a preferred design of the invention, the device is a wind power generator. In this context the component can be any element of the wind power generator that moves and/or is loaded during the operation of the wind power generator, for example a rotor blade, a rotor shaft, a transmission element or the like, without limiting the invention to the components of a wind power generator mentioned as examples.

A particularly preferred embodiment of the component of a device according to the invention is characterized in that the device is a chassis of a vehicle and the component is correspondingly in the form of a chassis component. In particular, without limitation, the component can be in the form of one of the following chassis components:

a damper element, preferably the piston rod of a damper element;

a control arm, preferably a transverse control arm, two-point control arm or multi-point control arm;

a connecting strut;

a hinged support;

a stabilizer, preferably roll stabilizer;

a steering element preferably a steering tie-rod, steering column or track rod.

Particularly in the chassis area, knowledge about the forces or deformations that act on the corresponding components is desirable in order, for example, to exchange structural elements in good time before they fail or, in connection with an active chassis influencing system, to obtain knowledge about the current driving behavior. For example, in the case of a chassis component such as a hinged support, which functions as a force-directing connection element between a stabilizer and the chassis, the tension or compression forces determined or even the bending loads that occur can serve as measurement parameters for a mechatronic stabilizing system which (automatically) acts upon the condition of the chassis in order to influence the driving behavior.

Although in what follows only a chassis component is spoken of, the explanations given below in the context of the present invention can certainly be extended to the wind power generators already mentioned. To supplement the coils or sensor arrangements described below, in the case of rotating shafts additional measuring means are required, which during rotation determine the distance to the shaft so that it can be detected and determined by computation.

In a preferred embodiment of the chassis component according to the invention, the field-generating means and/or the detection means are in the form of coils or comprise at least one coil. In this case the coil of the field-generating means will be called the energizer coil and the coil of the detection means will be called the measurement coil. The energizer coil induces an alternating field in the chassis component, which is absorbed and influenced by the material of the component during the time of the measurement. During a deformation and/or an elongation or compression due to tension or compression forces acting on the chassis component, the alternating magnetic field changes. This change is detected by the measurement coil, whose measurement signals can be electronically further evaluated in a suitable manner. Configuring the field-generating and detection means as coils makes it possible to use simple, inexpensive elements that are obtainable in various sizes. The energizing coil can co-operate with a so-termed field concentrator, which is formed in the manner of a coil core (iron core). Preferred embodiments of the field concentrator are discussed in detail in the annex.

Advantageously, the field-generating means and the detection means are arranged in fixed positions in a housing which is in turn arranged in a fixed position on the chassis component. Preferably, the field-generating means and the detection means are held fixed in the housing by a cast mass (for example cast plastic). The result of such a design is that no displacement of the field-generating means and the detection means relative to one another or to the chassis component takes place, which could otherwise have an adverse effect on the measurement or its evaluation. Such an arrangement has the advantage that no additional means have to be used, which in the event of a relative displacement between the above-named elements, would be necessary for the correction of the measurement signal influenced thereby, so that the design as a whole is inexpensive and simple to construct.

A preferred embodiment of the chassis component according to the invention provides that the chassis component has a fastening structure for the housing. The fastening structure is preferably made integrally with the chassis component, preferably by local deformation of the chassis component. In that case the local deformation of the chassis component can take place such that, for example by upsetting, projecting steps are formed on the chassis component, or even such that recesses or grooves are formed in the chassis component, onto or into which the housing is fastened for example by clipping it on or into place, for which purpose in both cases the housing preferably has complementary shaped features. An integral formation of the fastening structure with the chassis component makes it possible to do without additional fastening components, which would have to be specially equipped and designed to be complementary to the chassis component or the housing and which would increase costs and the complexity of assembly. It is also within the scope of the invention to fix the housing onto the chassis component by friction force or material-coherent means (such as adhesive bonding). The housing can be an assembly of several parts, wherein the individual parts can also be joined together by interlocking, friction force, or in a material-coherent manner (for example by bonding, welding, locking together, clipping, screwing, etc.).

Advantageously, the field-generating means and/or the detection means are arranged a distance away from the chassis component, as described in detail in the annex. Such a design enables a no-contact arrangement of the field-generating means or detection means on the chassis component. In this way the inherent disadvantages of the strain gauges used earlier, which had to be arranged directly on the surface of a component to be monitored and which were very sensitive to perturbing influences around them, such as corrosion, can reliably be avoided.

A further development of the chassis component according to the invention is characterized in that the chassis component has at least one weld seam and the field-generating and/or the detection means on the chassis component are positioned between about 30 mm and about 40 mm, preferably between about 34 mm and about 36 mm, and most preferably about 35 mm away from the weld seam. Investigations carried out by the applicant have shown that at the ideal distance of 35 mm a measurement particularly insensitive to interference can be obtained. If the distance between the weld seam and the field-generating/detection means is substantially smaller, there is a risk that due to any change of the material's structure—resulting from the welding process—measurement signals which are erroneous or which deviate from the normal case will be produced. The weld seam serves to form a cohesive material joint during the production of the chassis component. For example, a ball joint can be connected to an end area of the control arm by means of a weld seam. Due to the welding process heat is introduced into the components to be connected during the production of the chassis component. This changes the metallurgical structure in such manner that a measurement is not possible, or only unsatisfactorily so.

Alternatively, a ball joint can also consist partially of plastic, for example its housing. In that case the ball joint would be joined to the end area of the control arm by adhesive bonding. However, the housing can also be injection molded directly onto the end area of the control arm. The connection is then formed by the injection molding process. Material-coherent joining by bonding or welding would in that case not even be necessary.

In the context of another further development of the chassis component, according to the invention, it is provided that the field-generating means and/or the detection means are arranged in the area of a neutral fiber of the chassis component. In this way it can also be provided that the detection means and the field-generating means are essentially arranged in a plane further characterized in that the neutral fiber of the chassis component lies in the plane. As tests carried out by the applicant have shown, this enables measurement results to be obtained which are particularly suitable for determining or monitoring the loads on the chassis component. The "neutral fiber" is understood to mean that fiber or plane within the component which, in relation to the main bending direction of the component, essentially undergoes no extension or compression of the type that occurs in component areas away from the neutral fiber.

Advantageously, the measuring fixture has at least two field-generating means and at least two detection means, preferably exactly two field-generating and two field detection means, wherein most preferably the two field-generating and the two detection means are arranged on opposite sides of the chassis component. Such an arrangement enables both tension and compression forces to be detected.

Another preferred embodiment of the chassis component according to the invention is characterized in that the arrangement of the field-generating and the detection means relative to one another on the two sides of the chassis component is the same. This means that there is overall a symmetrical arrangement of the parts of the measuring fixture relative to a notional mid-plane of the component being monitored. By virtue of the symmetrical arrangement of the field-generating and detection means, particularly good measurement results can be achieved as will be explained in more detail in the annex.

The driver assistance system according to the invention for a vehicle, which driver assistance system comprises a chassis component according to the invention, is preferably designed in the form of one of the following systems:
ESP (electronic stability program; also: ESC),
ABS (anti-locking system),
track assistance system,
chassis stabilizing system, in particular one which comprises an actively controllable chassis stabilizer, preferably with an electric, pneumatic or hydraulic actuator, most preferably for stabilizing the vehicle against rolling.

In the driver assistance system according to the invention the measurement signals from the detection means are electronically processed further for control or regulation purposes. As an example, this will be explained with reference to the stabilizer: a mechanical torsion bar well known from the prior art or a hydraulic actuator is replaced by an electric actuator, in particular in order to avoid the long-term effect of high pressures. The measurement signals from the detection means are relayed to the actuator, which intervenes actively in the chassis control system of the vehicle, for example in the event that a tilt of the vehicle exceeds a specified limit value, in order to stabilize the position of the vehicle (roll stabilization).

A wind power generator can also be monitored in this way, for example in order to immobilize the rotor in the event of overloading.

The diagnosis system according to the invention for a device, in particular for a vehicle, comprises a component according to the invention (chassis component), wherein the diagnosis system is designed to store loading data of the component obtained by means of the measuring fixture, preferably electronically, so that they can later be read out for maintenance or diagnostic purposes. The use of the chassis component according to the invention in the diagnosis system makes it possible, for example, to detect loading limits which are stored in corresponding fault memories. During a subsequent visit to a workshop the fault memory of the vehicle can be read out, whereby for example it can be selectively determined which components should be exchanged due to overloading, even though quite possibly there may not yet be any visible defects. The same applies analogously for the maintenance of a wind power generator.

BRIEF DESCRIPTION OF THE DRAWINGS

Below, further advantages and characteristics of the present invention are explained with reference to example embodiments. The figures show:

FIGS. 24a, 24b: Side views of first and second, respectively, variations of a magnetic flux concentrator according to the invention.

DETAILED DESCRIPTION OF THE PREFERRED EMBODIMENTS

Figure 1:
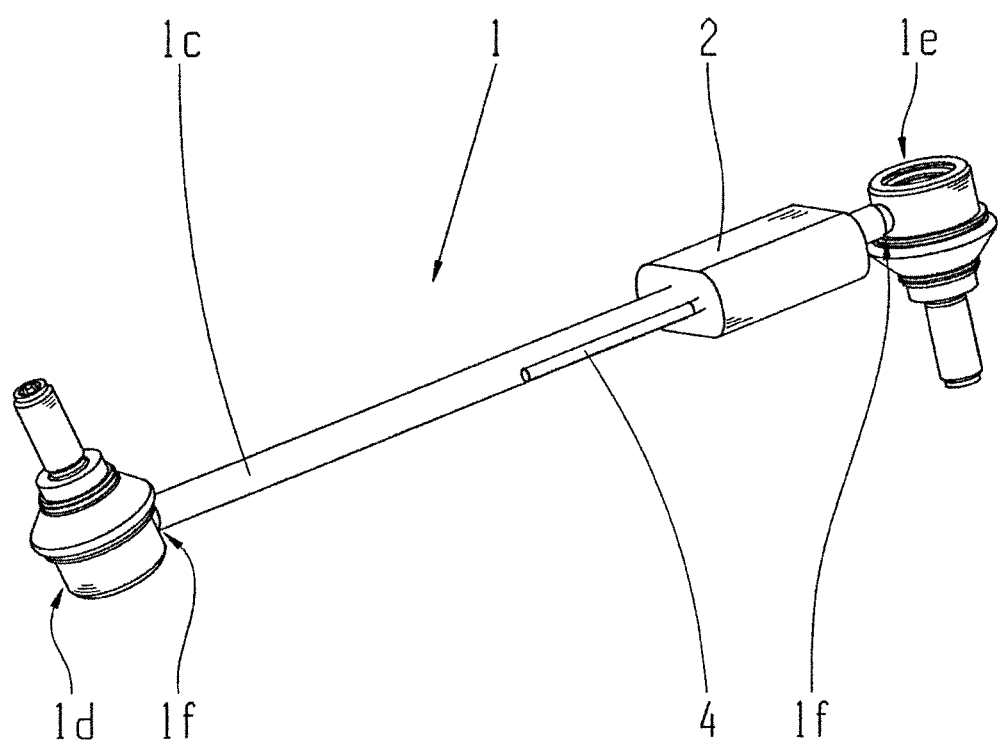
FIG. 1: A perspective view of a chassis component according to the invention with a measuring fixture and the housing that encloses the measuring fixture.

FIG. 1 shows a chassis component 1 according to the invention, which is in the form of a connecting strut 1c, for example a hinged support, and which has at its ends ball bearings 1d, 1e or corresponding bearing sleeves. At the points indexed 1f the connecting strut 1c is joined to the ball bearings 1d, 1e in a material-cohesive manner by means of a weld seam, although this cannot be explicitly seen in the figures. On the chassis component 1 is arranged a housing 2, preferably made of plastic. In the housing 2 is arranged, in the manner described in the introduction and in the annex, a measuring fixture (not visible in FIG. 1), which will be described in more detail below with reference to the other figures. The housing 2 protects the parts of the measuring fixture and secures them in position relative to the connecting strut 1c and the component 1. Cables 4 emerge from the housing 2 to carry the measurement signals emitted. The cable connections lead, for example, to the control unit of a stabilizer or to an electronic fault memory of the vehicle. In addition, the cables 4 contain leads for controlling and for supplying electricity to the measuring fixture.

In the housing 2 are arranged field-generating means and detection means of the measuring fixture mentioned several times already (not shown). The arrangement of the means is explained with reference to the figures below.

Figure 2:
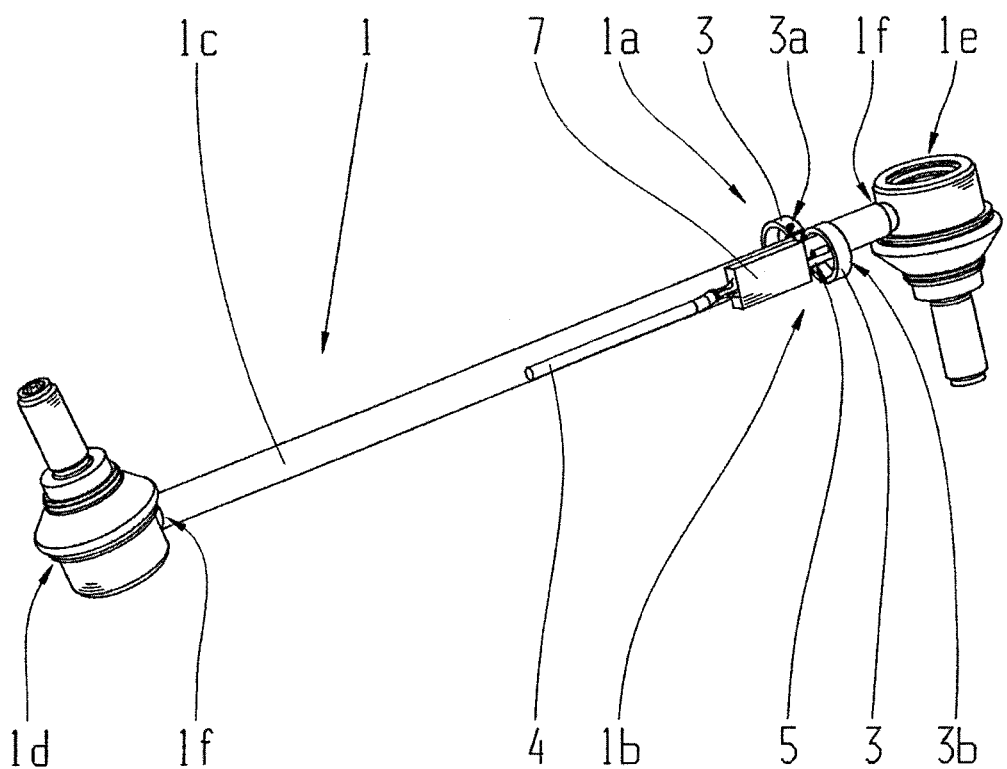
FIG. 2: The chassis component according to the invention shown in FIG. 1, without the housing.

FIG. 2 shows the chassis component 1 of FIG. 1, but without the housing 2, so that the measuring fixture indexed 1a in FIG. 2 can be seen. The measuring fixture 1a comprises field-generating means 3, or more precisely: a first field-generating means 3a and a second field-generating means 3b, detection means 5 (of which only one is visible) and electronic means 7 for the further processing (evaluation, storage, etc.) of the measurement signals produced by the measuring fixture 1a. The cables 4 already mentioned are connected to the electronic means 7. Besides the transmission of measurement or evaluation signals, the cables 4 also serve in particular for the supply of energy to the measuring fixture as a whole, including the actual sensors (indexed 3 and 5) and the associated electronics 7.

The field-generating and detection means 3, 5 are located in a metallic, magnetizable portion 1b of the component 1 or connecting strut 1c. However, it is within the scope of the invention to make the entire connecting strut 1c from the metallic, magnetizable material. The portion 1b then includes the whole of the connecting strut 1c.

Figure 3:
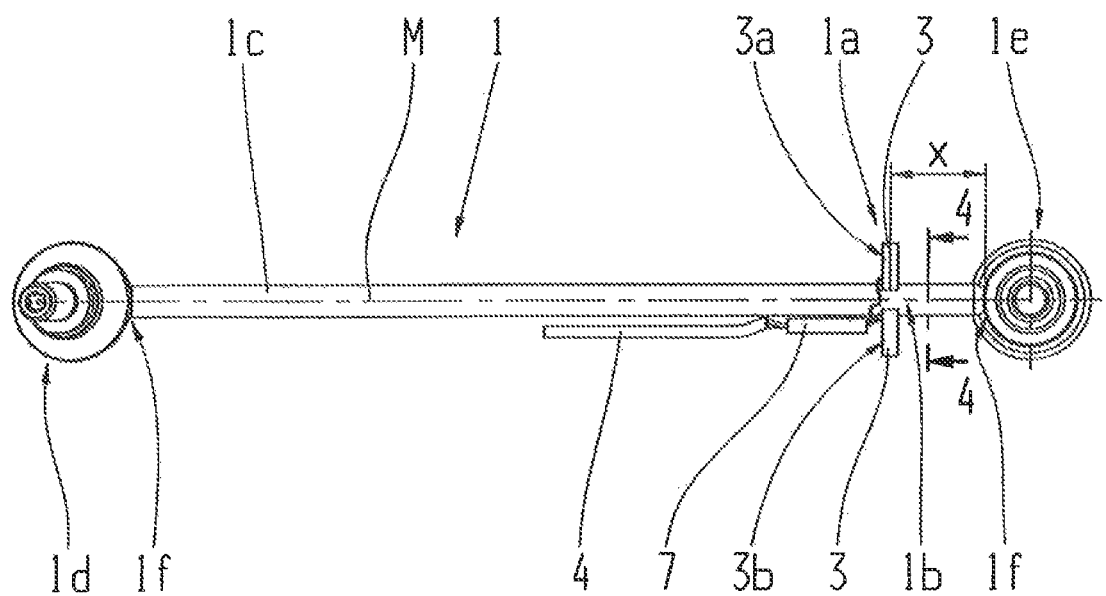
FIG. 3: A view of the chassis component with its measuring fixture shown in FIG. 2, as seen from above.

FIG. 3 shows the chassis component 1 in FIG. 2 as viewed from above. Relative to the (right-hand) end of the connection strut 1c, the two field-generating means 3a, b and the detection means (not visible in this case) are arranged on the chassis component 1 at the same level and the same distance away from the connecting strut 1c. This gives a symmetrical design of the measuring fixture 1a relative to the mid-plane M of the chassis component 1 or connecting strut 1c.

As shown in FIG. 3 the measuring fixture 1a is a distance x away from the weld seam 1f in the area of the ball joint 1e or the bearing sleeve concerned. The distance x denotes in particular the distance from the mid-point of the detection coils (see for example FIG. 4) to the weld seam 1f. A value of x=35 mm±1 mm has been found particularly appropriate in practice.

Figure 4:
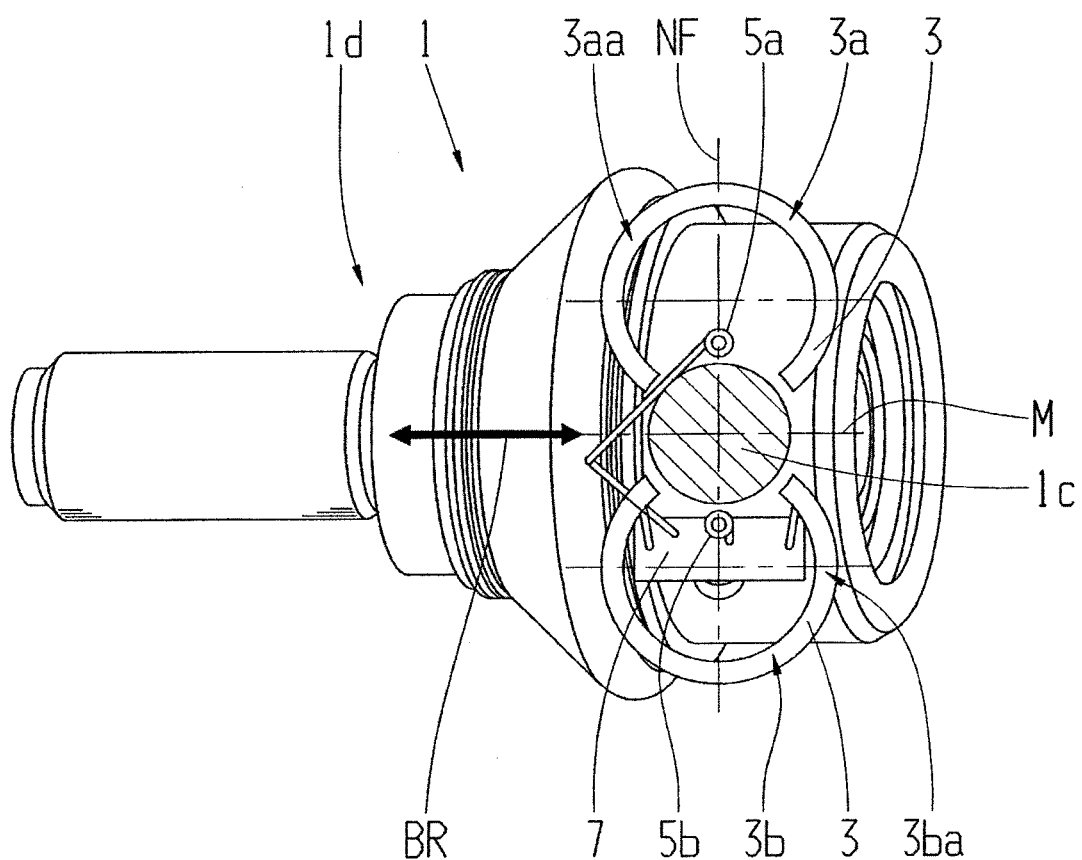
FIG. 4: A sectioned view along the line 4-4 in FIG. 3.

FIG. 4 shows a sectioned view through the chassis component 1 taken along the line 4-4 in FIG. 3. The connecting strut 1c is at least partially enclosed by two field-generating means 3a, b of partial annular overall shape. Each partially annular-shaped element 3aa, 3ba constitutes a field concentrator which acts in the manner of a known coil core, as explained in more detail in the annex. The actual field-generating or energizer coil arranged respectively around the field concentrator 3aa, 3ba is not shown in FIG. 4 to make the illustration easier to understand. Between the field-generating means 3a, b and the connecting strut 1c are arranged two detection means 5a, b, one detection means (measurement coil) 5a being arranged on the side of the first field-generating means 3a and the other detection means (measurement coil) 5b on the side of the second field-generating means 3b. Furthermore, the neutral fiber of the chassis component defined earlier in the description is shown symbolically in FIG. 4, indexed NF. This is the notional plane in the connecting strut 1c which, when the strut is loaded by bending as indicated by the double arrow BR, essentially undergoes no extension or compression as happens above and below the neutral fiber NF (on the right and left in FIG. 4).

The field-generating means and detection means 3a, b; 5a, b are arranged in the same way on the two sides of the connecting strut 1c, in such manner that the (notional) centers of each individual means lie on a line. This gives the symmetrical design of the measuring fixture 1a, already mentioned.

The electric connections also visible particularly in FIG. 4 between the parts of the measuring fixture 1a and the electronic unit 7 are not explicitly shown, for the sake of simplicity.

The field-generating and detection means 3, 5 shown in FIG. 4 are arranged offset relative to the main bending direction of the strut 1c denoted, as an example, by the arrow BR. Investigations by the applicant have shown that such an arrangement of the measuring fixture 1a gives particularly advantageous measurement results.

Figure 5:
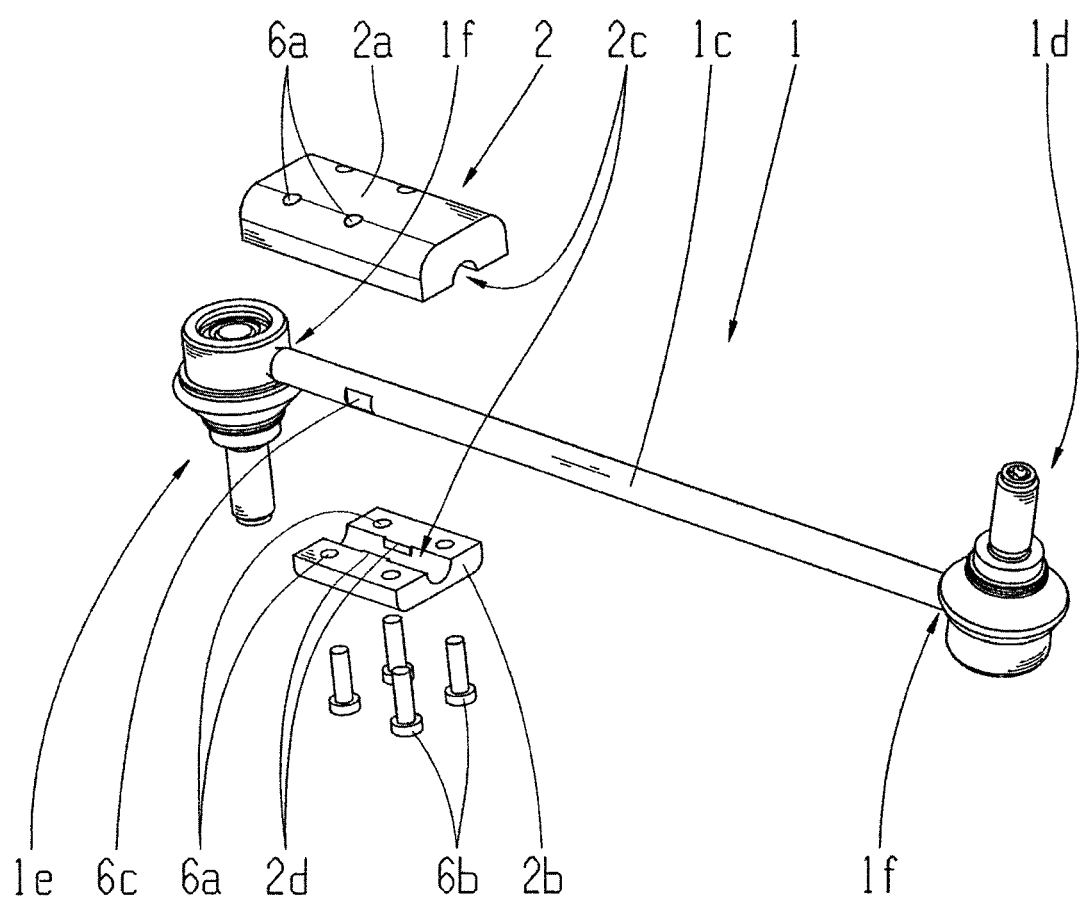
FIG. 5: An exploded view of a chassis component according to the invention with the measuring fixture and its housing.

FIG. 5 shows an exploded view of the chassis component 1 according to the invention, with a housing 2 consisting of an upper housing half 2a and the lower housing half 2b. In the two housing halves 2a, 2b corresponding apertures 6a are provided in order to enable the housing halves to be joined around the strut 1c by means of fasteners 6b, preferably in the form of screws or screw-bolts, to form the complete housing 2. The inside of the housing is filled with a (plastic) cast mass 2c which surrounds the parts of the measuring fixture protectively, including the electronic unit, and ensures that their relative positioning is maintained.

Figure 6:
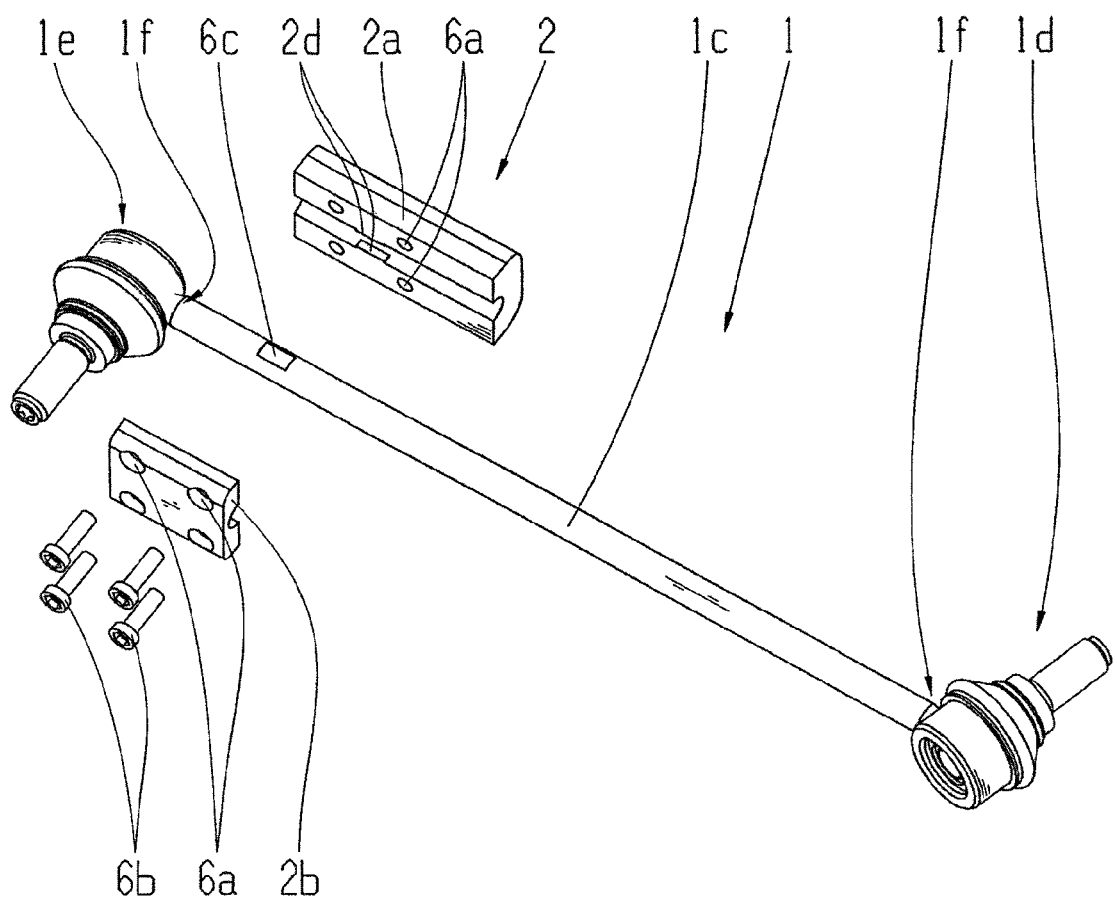
FIG. 6: A slightly rotated view of the exploded representation in FIG. 5.

FIG. 6 shows a slightly rotated view of the chassis component 1 according to the invention as represented in FIG. 5. For completeness, let it be pointed out that the lower housing half 2b has apertures 6a which are in part larger than those in the upper housing half 2a, in order to enable complete countersinking of the fastening means 6b. Furthermore, on the chassis component 1 or strut 1c a fixing structure 6c is provided on both sides in the form of a recess for the location of the housing 2. Correspondingly, on its upper half 2a and on its lower half 2b the housing 2 has projections 2d which are designed to fit into the recesses 6c in the strut 1c, in order to enable the measuring fixture to be fixed exactly at the required (measurement) position on the strut 1c.

Figure 7:
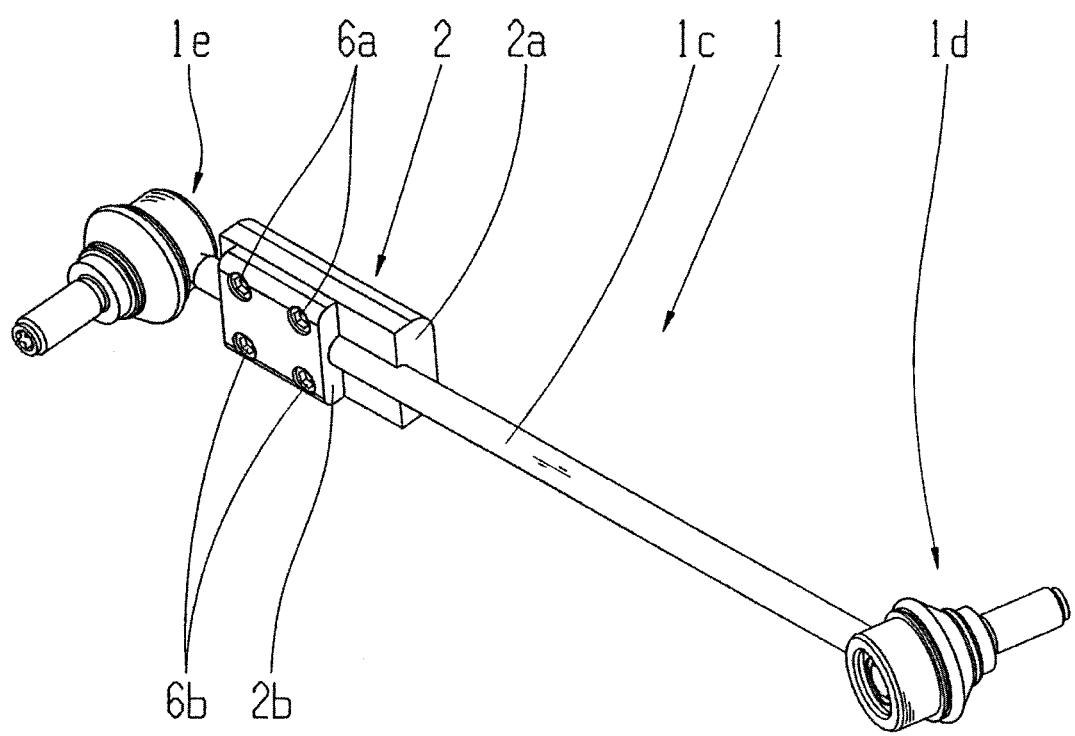
FIG. 7: A view of the object in FIGS. 5 and 6 after assembly.

FIG. 7 shows the elements of the two exploded views in FIGS. 5 and 6 in the assembled condition, with the fastening means 6b countersunk in the apertures 6a.

Annex: Device Having a Measuring Apparatus for Measuring Forces and/or Loads

Below, preferred features of a measurement method and design details of the measuring fixture (sensor) will be described. This description is based on a parallel patent application by Polyresearch AG with the same timing.

In what follows, and without placing any limit on its generality, the measuring fixture will be referred to as the sensor or bending sensor. Likewise, without placing any limit on generality, the field-generating means will be referred to as the inductor, the magnetic field-generating coil or the primary coil and the detection means as the magnetic sensor element.

In all the figures the same indexes denote the same, or functionally equivalent elements.

Active Bending Sensor

For the measurement of bending forces, in industry and in research and development laboratories strain gauges are used in most cases. There are only a few alternative sensor systems available, that can provide appropriate bending sensor measuring performance and which are suitable for the environmental conditions in which such sensors are intended to be used. In general, however, such systems are too expensive for mass production (which is typical in the automotive industry, in the industrial sector and in the consumer sector).

No inexpensive bending sensor systems are available for applications in which the test object (such as a transmission shaft) rotates during its use. For that, an inexpensive and no-contact measurement technique is required. The following description relates to a design of a mechanical force sensor that works on magnetic principles, which can detect and quantify mechanical forces in ferromagnetic objects such as a transmission shaft, a screwdriver shank, torque wrenches or a drilling machine shaft.

The unique features of this "active" sensor system are as follows:

A genuinely no-contact sensor principle
Operates on magnetic principles
Insensitive to magnetic fields already present or stored in the test object
The test object does not in any way need to be pretreated (the "active" bending sensor module is held close to the test object and functions immediately without further preparation measures)
The sensor's performance cannot deteriorate over time, since an active sensor principle is being used
Insensitive to torques (for measurements in differential operating mode I)
Sensitive to a bending force in only one axis (no cross-induction between bending forces in the X and Y axes)
Functions on test objects that are stationary or rotating at any speed
Insensitive to light, dust, mechanical shocks of any type, water, humidity, oil, etc.
Functions with any metallic test object material so long as it attracts a magnet
Tolerates varying air gaps/distances between the test object and the sensor module
No upper limit for test object size (for example shaft diameter)
Operates in a temperature range from −50° C. to over +210° C.

What is the difference from other sensor technologies?

1. This sensor does NOT need to be physically in contact with the test object. Even with a gap of a couple of millimeters (between the sensor and the test object) it still functions properly. Thus, the sensor functions quite independently of the condition of the test object's surface (coated, painted, dusty, etc), which is ideal for measuring on building sites, bridges, cranes, supporting frames, etc.

2. The sensor functions with ANY metallic material, so long as the magnetic properties of the material suffice to attract/hold a permanent magnet (does not apply in the case of sintered materials, which are too brittle when bending forces are imposed).

3. The test object does not need to be modified in any way. The test object is not processed in any way.

Sensor structure

The sensor consists of two main modules:
the actual sensor element (made using passive electronic components), and
the sensor's electronic unit Both modules can be accommodated together in the same housing, but they can also be arranged separately from one another and only connected to one another by a number of cables. The length of the cables is restricted by a natural limit (in the range of 2 meters or more).

Figure 8A:
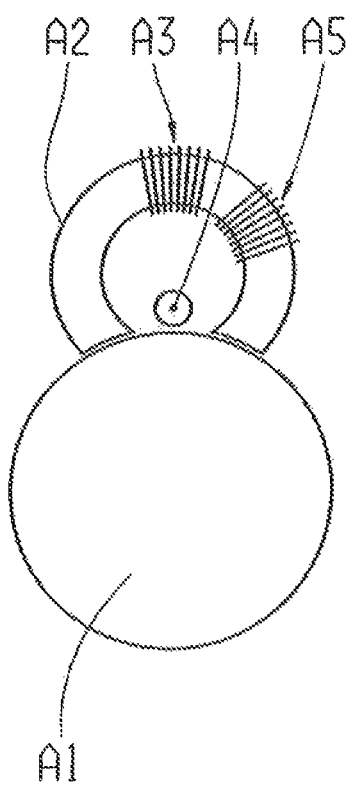
FIGS. 8a, 8b: Front and side views, respectively, of an example of a sensor structure according to the invention.
Figure 8B:
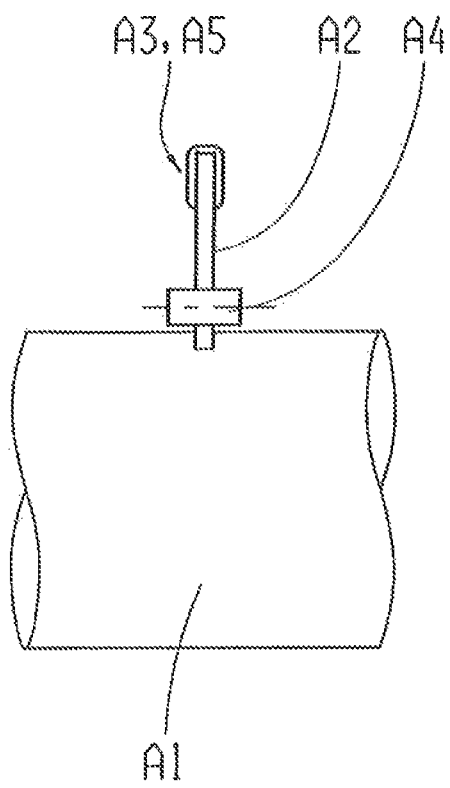

An example of the structure is shown in FIGS. 8a and 8b, with a side view in FIG. 8a and a front view in FIG. 8b. A test object A1 is shown.

The representation in FIGS. 8a and 8b is only one of several possible structures of the sensor element. The main components are shown in the drawing. These are:

Magnetic flux concentrator A2
Magnetic field-generating coil (inductor) or primary coil A3
Magnetic sensor element (which can be any type of magnetic field sensor device: coil, Hall effect, MR, GMR, etc.) A4
Optionally: signal feedback coil (inductor) or secondary coil A5.

Figure 9:
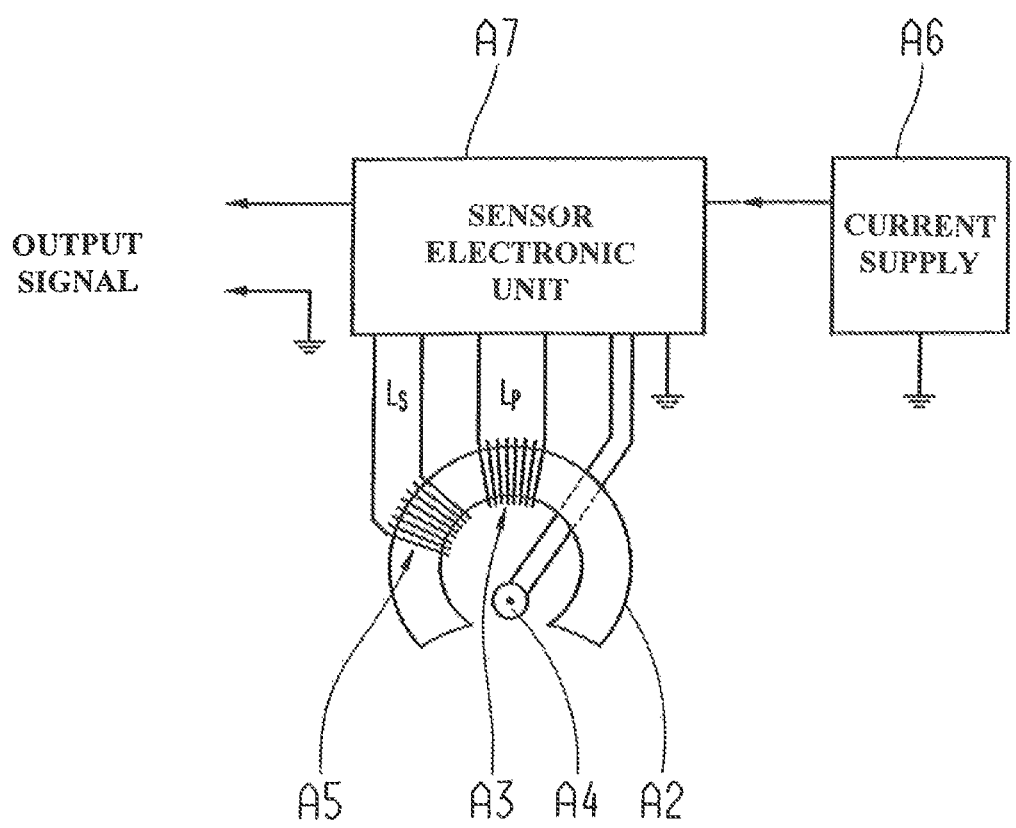
FIG. 9: An example of an individual sensor element according to the invention.

A complete and individual sensor element preferably consists of all the components shown in FIG. 9. The feedback coil A5 ($L_S$—secondary inductor) can optionally be included and is only needed if any distance changes (between the test object and the sensor module) have to be compensated automatically. In addition a current supply A6 and the sensor's electronic unit A7 are shown.

Important: The function of the feedback coil can be used when the field-generating coil is operated with an alternating-voltage control signal.

The "optional" feedback coil ($L_S$) is used to detect and measure the distance (or gap) between the sensor element and the surface of the test object. The signal measured by this coil is used for compensating the undesired signal amplitude modulation which occurs when the distance between the test subject and the sensor element changes continually. In applications in which the distance does not change, no feedback coil is needed.

Figure 10:
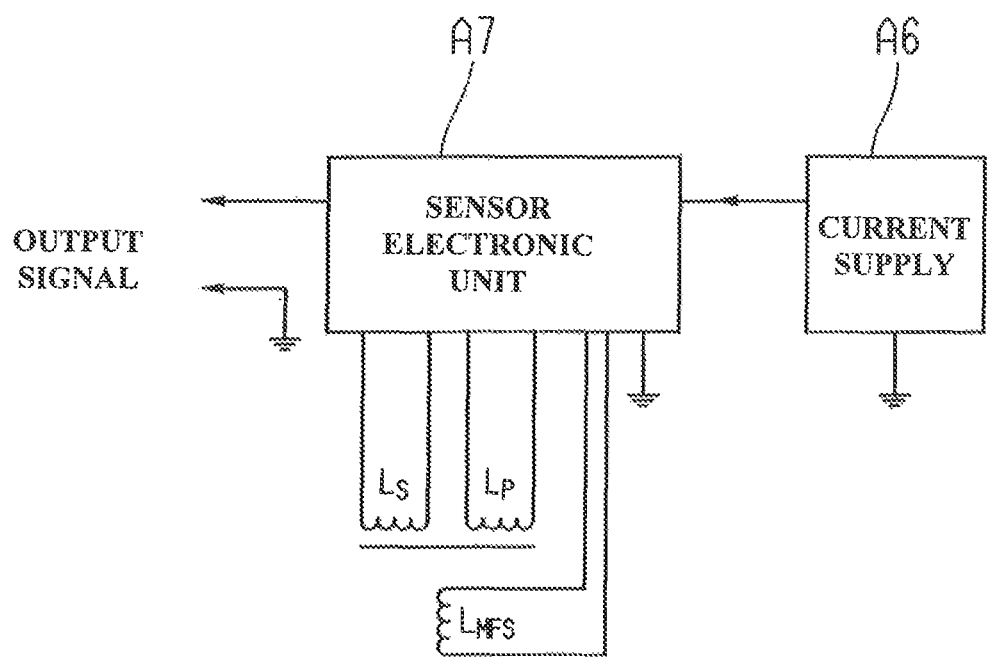
FIG. 10: Another example of a sensor element according to the invention.

FIG. 10 shows the following: the field-generating coil (LP—primary inductor) and the feedback coil (LS—secondary inductor) are arranged on the same flux concentrator. Signals produced by the field-generating coil can be picked up and measured by the feedback coil. The signal transfer function is influenced by the distance between the flux concentrator and the surface of the test object. The smaller the air gap between the two poles of the flux concentrator ends and the surface of the test object, the more efficient is the magnetic transfer between the primary and secondary coils. This relationship is not strictly proportional and has to be linearized by the sensor's electronic system.

Figure 11:
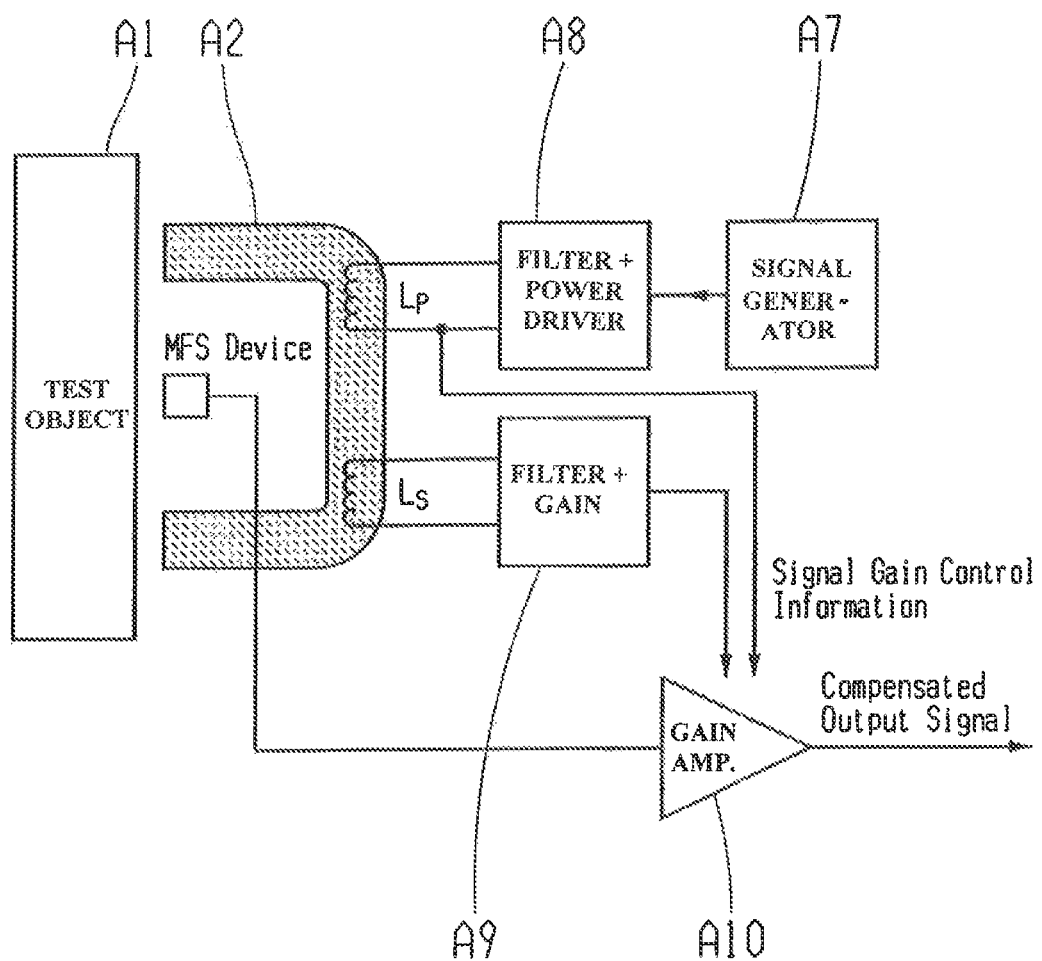
FIG. 11: Yet a further example of a sensor element according to the invention.

FIG. 11 shows the following: a change of the distance between the flux concentrator and the test object results in a change of the amplitude of the signal measured by the feedback coil $L_S$. The signal amplitude information from the field-generating coil LP and the feedback coil $L_S$ makes it possible for an amplifier with variable amplification to correct the otherwise varying bending signal amplitude. Important in this: it may be necessary first to linearize the feedback coil signal before it is passed on to the amplifier with variable amplification. The components/functional blocks shown are: a signal generator A7, a filter and power driver A8, a filter and gain A9 and a variable-gain amplifier A10.

Measuring in the Differential Operating Mode

To distinguish between the relevant bending force and other mechanical forces (such as torques), two sensor elements of identical make-up are arranged symmetrically on the two sides of the test object. By subtracting the measured signals one from the other the potentially existing torques cancel out, leaving behind the relevant bending forces.

The two signals (one from each individual sensor element) can be processed mathematically in various ways:
  Connecting the magnetic field sensor coils to one another in the reverse sequence (series connections such that the measured signals are subtracted one from the other, without the use of active electronic means),
  Feeding the individual and processed measurement signals into a summation circuit working in analog mode, to subtract the signals one from the other.
  Using a digital processing system (such as a microprocessor) to carry out the mathematical signal processing. This is the most flexible system.

Important here: if the method proposed first is chosen (connecting the positive magnetic field sensor coils in series), great care must be taken to ensure that the signal amplitudes and existing opposite signal offsets are well matched to one another. Otherwise, the resulting signal will contain cross-induction and is then distorted (compared with the relevant output signal).

Sensor Orientation Relative to the Test Object

Two fundamentally different sensor designs give good measurement results, here called "Design 1" and Design 2" (owing to similarities with other objects when considering the sectioned views pictured below: "Glider" and "Monkey", respectively FIG. 12a and FIG. 12b.

Figure 12A:
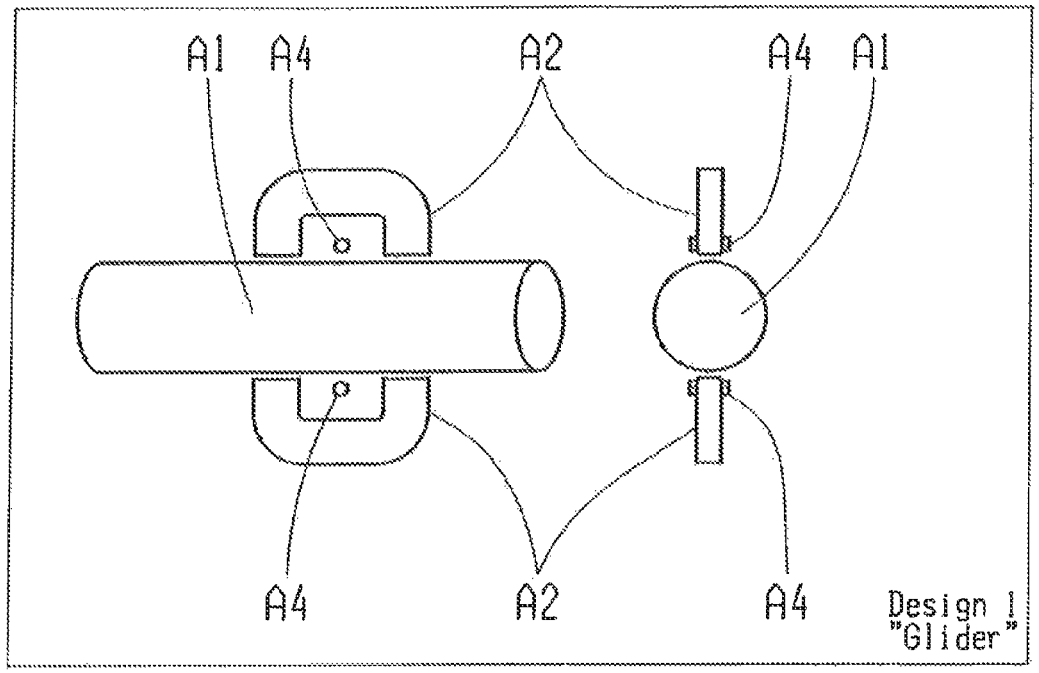
FIGS. 12a, 12b: First and second sensor designs showing two possible sensor element orientations relative to the test object according to the invention.
Figure 12B:
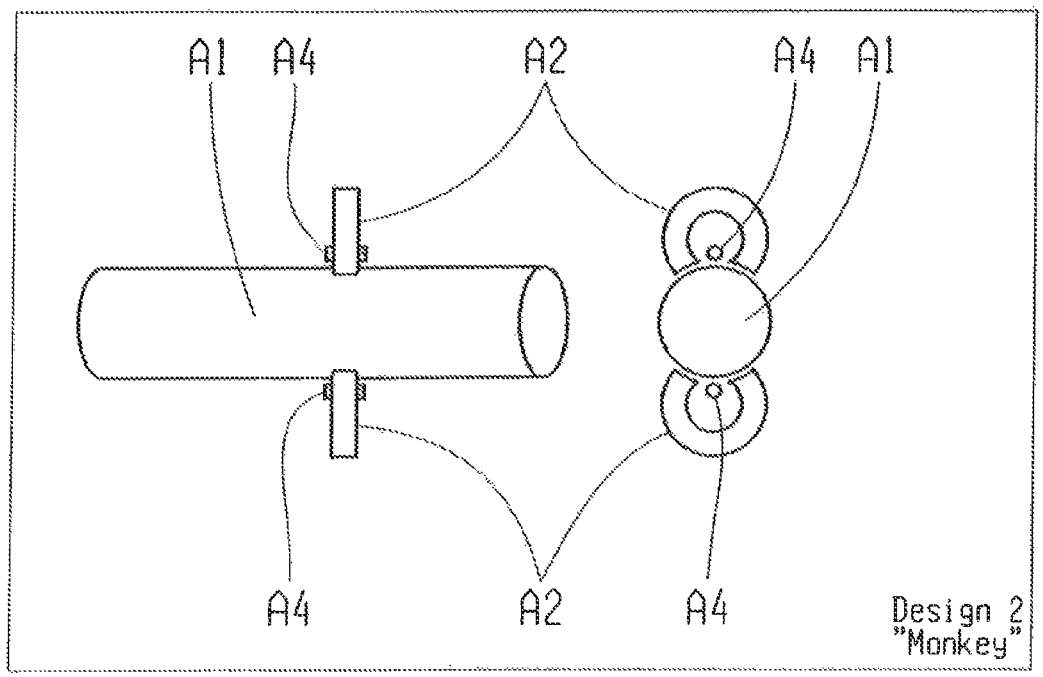

FIGS. 12a and 12b show the following: two of the possible sensor element orientations relative to the test object. The dark-colored parts symbolize the magnetic field sensor device, which can be either an inductor with a core, a Hall effect sensor, MR, GMR, or any other magnetic field device which is suitable for the desired measurement range. The orientation of the magnetic field sensor device relative to the magnetic field lines (between the two poles of the flux concentrator) is critical, as explained in another section of this description.

What happens if the differential operating mode is not used?

Naturally, it is also possible to use a single sensor cell for measuring the desired mechanical forces. The use of only one sensor cell reduces costs sill farther and makes the sensor much smaller. In that case, however, it is no longer possible to distinguish between the bending forces applied and the other mechanical forces potentially present, such as torques and bending in other axes. Thus, the use of a design with a single sensor cell means that the sensor module picks up several different mechanical forces at the same time, without it being possible to distinguish between them.

The only way in which an active bending sensor having a single cell can be used appropriately, is if the test object is designed and fixed to the location where it is used in such manner that ONLY the desired forces act effectively in it. This therefore means that no interfering mechanical forces such as torques are present.

Figure 13A:
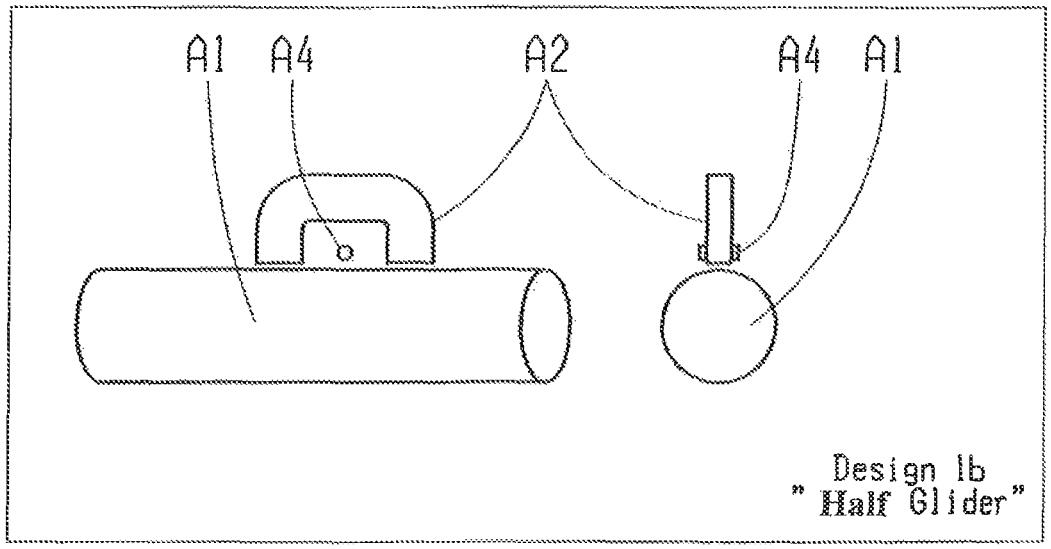
FIGS. 13a, 13b: First and second sensor designs showing only one sensor element according to the invention.
Figure 13B:
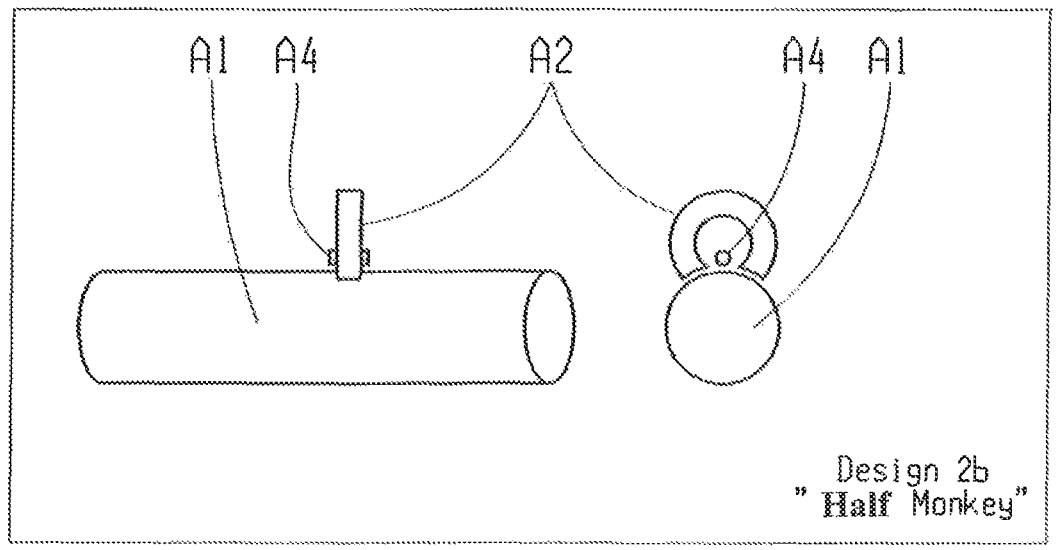

FIGS. 13a and 13b show the following: the use of only one sensor element is only to be recommended if, apart from the relevant bending forces, no other mechanical forces are applied to the test object. Otherwise, the output signal of the active bending sensor element will be a combination or mixture of the relevant and the interfering mechanical forces.

Test Object Material

To begin with it was assumed that the quality and performance (regarding magnetic properties) of the test object material should be similar to those necessary when bending sensors are fitted, which are based on the magnetostriction principle. These ferromagnetic materials are slightly more expensive than "normal" steels, since they have to contain nickel, chromium or similar elements, either alone or in combination.

Test results (during the design and construction of an active bending sensor) have shown that a much wider selection of metallic materials than expected can be used. So long as a permanent magnet can stick to a test object, the active bending sensor too will work. To achieve the best possible measurement signal quality it is recommended to harden the test object material, at least in the sensor area. The "sensor area" is the location at which the active bending sensor will be arranged. If this is not done, the result is a relatively large measurement hysteresis.

Residual Magnetic Fields in the Test Object

Bending Sensor Operated with Direct Voltage (Static Field):

When test object materials are used which have ferromagnetic properties and can be permanently magnetized, such a material should NOT be used with an active bending sensor operated with direct voltage. The reason for this is that such a material, at the position where the active bending sensor is located, will slowly but surely become a bar magnet (which means that the place where the active bending sensor is located will itself become a magnet after a time. Here, "after a time" means after a couple of seconds or after a couple of minutes).

When that happens, the signal offset of the bending sensor output signal drifts in one direction and is therefore not stable. Conversely, it is thus only logical that a bending sensor operated with direct voltage is VERY sensitive to magnetic fields stored under the surface of the test object. Before use, the material of the test object must accordingly first be demagnetized.

Bending Sensor Operated Dynamically (with Alternating Voltage):

When the active bending sensor is operated in an alternating voltage mode (the field-generating coil is energized by a symmetrical alternating current of fixed frequency) AND when standard inductors with a ferromagnetic core are used, the design of the active bending sensor is in most cases INSENSITIVE to magnetic fields stored in the test object.

"In most cases" means that cases are possible in which the bending sensor operated with alternating voltage is sensitive to magnetic fields stored under the surface of the test object.

For example, if it is assumed that in the test object ONE magnetic point (in the sensor area) is stored, and if it is further assumed that TWO sensor coils are arranged symmetrically around the shaft, then the signal produced by the magnetic point (at a rotation speed of 300 revolutions per second (equivalent to 18,000 min$^{-1}$)) will distort the internal signal decoding function of the sensor system.

Sensor Electronic System

Arrangement of the Sensor Coil (MFS)

The orientation of the sensor coil (in relation to the magnetic field lines produced by the generating coil and the flux concentrator) determines WHICH mechanical force will be detected and measured, and HOW LARGE the amplitude of the measurement signal will be (signal quality).

Field of Application

With conventional bending sensor techniques it was necessary for the sensor elements to be attached firmly to the surface of the test object, in order to ensure that the relevant mechanical forces in fact acted through it so that they could be measured. The necessary cable connections (to and from the sensor element), the environmental constraints (humidity and cyclically fluctuating temperatures limit the useful life of the sensor element) and the costs associated with such sensor techniques, restrict their use and make them unusable for mass applications.

The active bending sensor overcomes all these problems and can therefore be used in many different fields: the automotive industry, avionics, production technology, consumer goods, measurement and control technology, such as:
- diagnosis and preventative monitoring of large structures (bridges, tall buildings, etc.),
- real-time measurements in automotive/truck wheel suspensions for active wheel suspension or active stability control,
- avionics: wing loads in bad-weather situations; diagnoses in the airframe structure,
- DIY and professional tools: design of torque wrenches (by bending forces); and tool overloading recognition,
- wind power: turbine structure and propeller structure during hurricane blasts,
- industrial pressing machines, such as paper mills, steel production and tool equipment (detection of force limits to avoid damage to tools and materials).

Functional Principles

A generating coil is energized either by a direct voltage or a specific alternating voltage signal, and then produces a magnetic flux under the surface of the test object. The mechanical forces passing through the test object influence the direction of the magnetic field lines in their course from one pole of the flux concentrator to the other. The change in the direction followed by the magnetic field lines can be detected by a magnetic field sensor device arranged at the surface of the test object. The signal changes picked up by the magnetic field sensor device are proportional to the relevant mechanical forces applied to the test object.

When an electric direct voltage is used to energize the field-generating coil there is a risk that a small section of the test object (depending on its material) will become permanently magnetized. This then results in a signal offset which can look like a real signal caused by mechanical forces. That problem can be overcome by using an electric alternating-voltage energizing signal to operate the field generator.

However, only specific frequencies are suitable for detecting and measuring mechanical forces in the test object.

Physical Dimensions of the Sensor

Figure 14A:
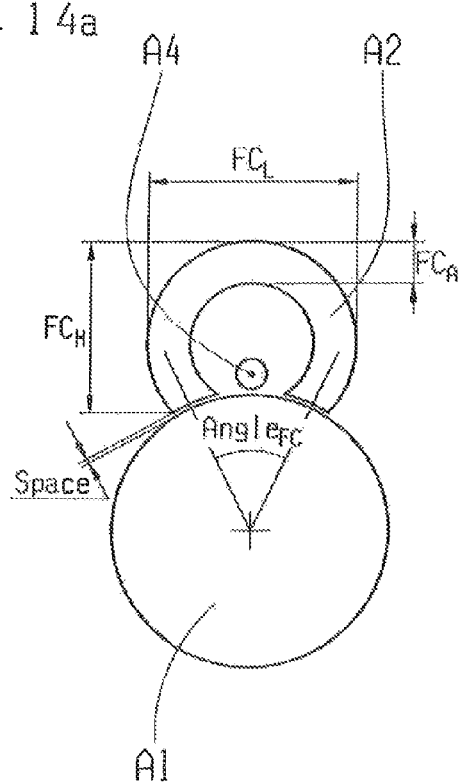
FIGS. 14a, 14b, 14c: A side view and first and second front views, respectively, of another example of a sensor element according to the invention.
Figure 14B:
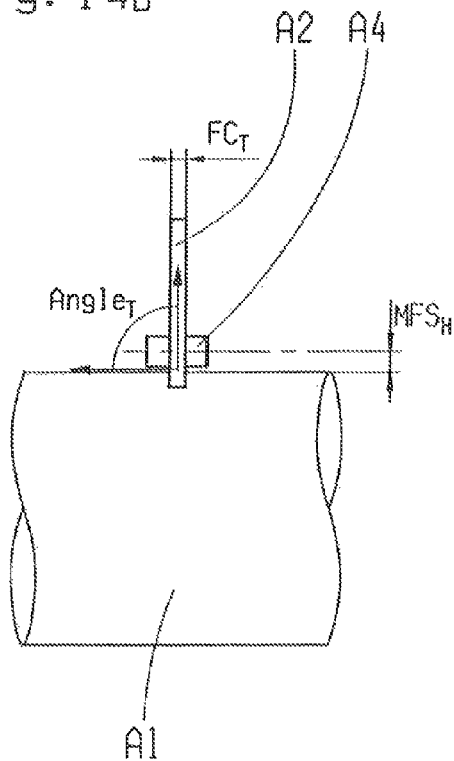
Figure 14C:
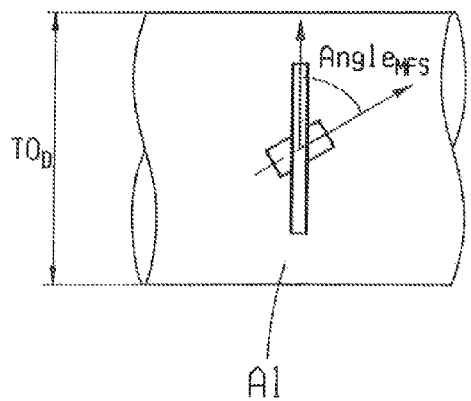

FIGS. 14a, 14b, 14c show the following, in a side view 14a and two front views 14b and 14c: the angle$_{MPS}$ determines WHICH mechanical forces will be measured and what the quality of the measurement signal will be. The angle also determines potential "cross-induction" in the measurement signal, which can be caused by the various mechanical forces that may be applied to the test object.

Research and Development Project:

Active Sensor for Mechanical (Bending) Forces

One of the main differences between a passive and an active sensor for mechanical forces, is that no "permanent" magnetization of the test object is necessary in order to obtain a functioning sensor. An active sensor for mechanical (bending) forces can start operating as soon as the sensor hardware has been suitably arranged in the close vicinity of the test object.

The following task list description concentrates on one or two of the "most probable" configurations of an active sensor for mechanical (bending) forces, which achieve the desired sensor performance. The two physical hardware implementations for the sensor which have so far given the best results, are here called the glider and the monkey designs. Early results indicate that "monkey" gives slightly better results than "glider", but "glider" is somewhat simpler to produce.

Active Sensor for Mechanical (Bending) Forces

Definitions

Figure 15:
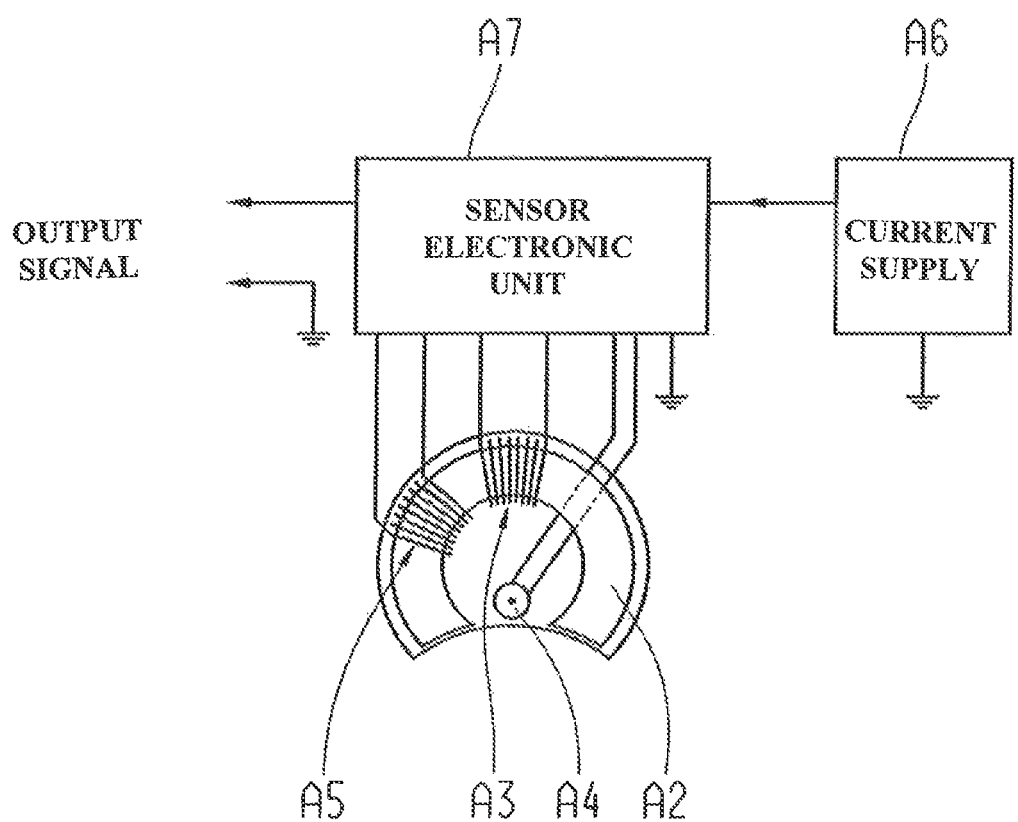
FIG. 15: A further example of a sensor element according to the invention.

The active sensor system comprises a number of modules:
sensor hardware (flux concentrator, generating coil, feedback coil, MFS coil)
electronic unit
6-conductor connecting cable between the sensor hardware and the electronic circuit
electric current supply
2-conductor cable between the electronic circuit and the current supply This is shown schematically in FIG. 15.

The sensor hardware is positioned laterally close to the test object (such as a driveshaft).

Figure 16A:
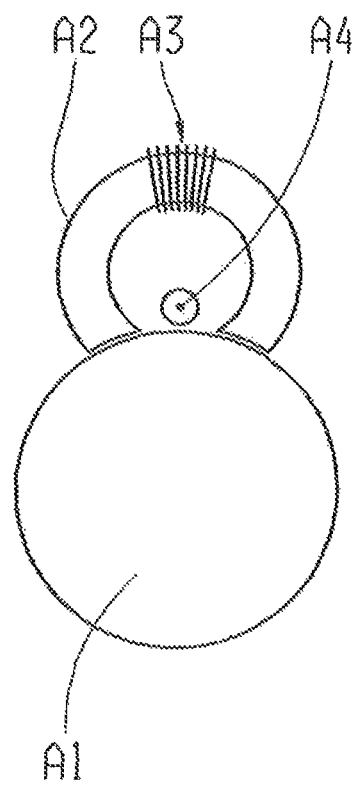
FIGS. 16a, 16b: Side and front views, respectively, of a sensor element having sensor hardware positioned close to the test object.
Figure 16B:
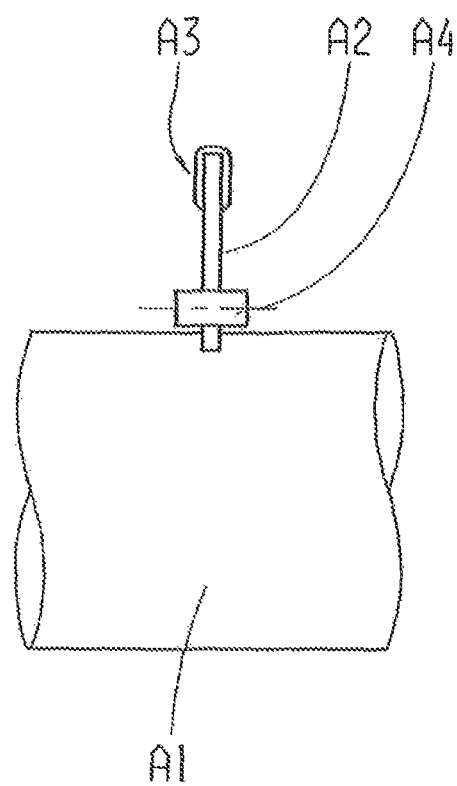

This is shown schematically in FIGS. 16a and 16b, wherein FIG. 16a is a side view and FIG. 16b is a front view.

To begin with, 40 different sensor designs were defined and almost half of them were tested. Design No. 27 produced the first usable test results. The drawing above shows Design No. 27 with substantial improvements.

Target Characteristics for Satisfying Current Market Requirements

Since this is a quite new sensor technique, it is difficult to define what the target characteristics should be. In principle the target characteristics are defined by the application in which the sensor is used. However, starting from a knowledge of the market acquired over the last 10 years an assumption can be made about what the "minimum" requirements are with which the active bending sensor can be expected to be successful on the market. Furthermore, it is also possible to define what an "average" specification would be like, which is here called "Standard", and what an "Outstanding" performance of the active bending sensor would turn out to be.

| Specification | Explanation | Minimum typical | Standard typical | Outstanding typical | Unit |
|---|---|---|---|---|---|
| Smallest usable shaft diameter | | 20 | 12 | 10 | mm |
| Largest usable shaft diameter | | 50 | 100 | unlimited | mm |
| Signal resolution | digital equivalent | 8 | 10 | 12 | Bit |
| Reproducibility | percent of maximum | ±1 | ±0.5 | ±0.1 | % max |
| Signal band width | analog Hz | 100 | 1,000 | 10,000 | Hz |
| Signal hysteresis | when using ferro-magnetic materials | ±2 | ±0.5 | ±0.2 | % max |
| Output signal range | Maximum negative to maximum positive torque | 1.5 | 2 | 4 | V |
| Signal-to-noise ratio | | 10 | 5 | <2.5 | mV |
| Air gap variation | Variation of the distance between sensor and shaft | none | 1.5 | 4 | mm |
| Sensor hardware height | radial distance required for a shaft 25 mm thick | 25 | 20 | <15 | mm |
| Current consumption | | <250 | <125 | <75 | mA |
| Operating temperature range | sensor hardware only | 0 to +70 | −20 to +85 | −40 to +150 | °C. |

Dimensioning of the Active Bending Sensor

Figure 17A:
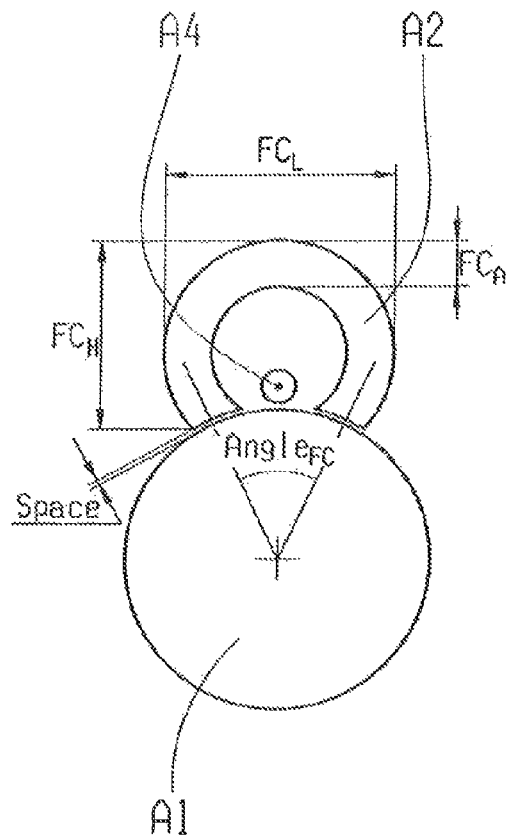
FIGS. 17a, 17b, 17c: A side view and first and second front views, respectively, of yet another example of a sensor element according to the invention.
Figure 17B:
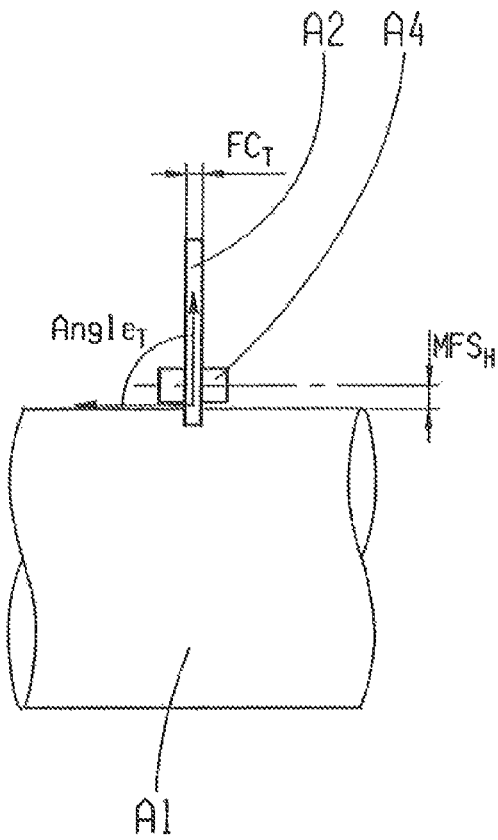
Figure 17C:
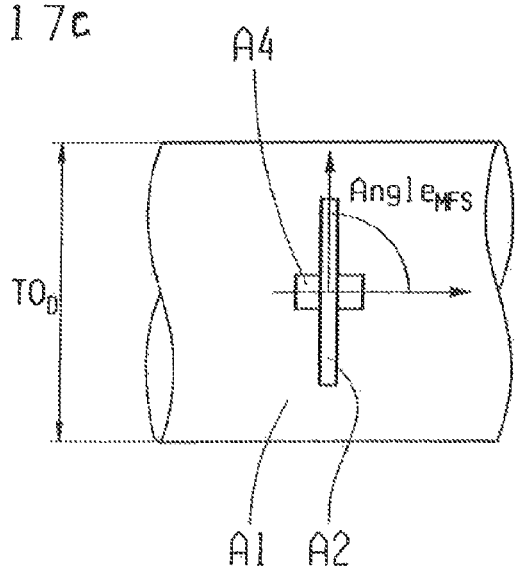

To support the technical "communication" when reporting and documenting the dimensions of an active bending sensor hardware unit, the following dimension parameters were established:

The respective parameters of the table below are additionally entered in FIGS. 17a, 17b, 17c, wherein FIG. 17a is a side view and FIGS. 17b and 17c show front views.

The characteristic values shown below are only examples for a specific active sensor model (out of the 4 or 5 made until now). These specifications still have to be optimized and their effects in relation to sensor performance still better understood.

| Specification | Symbol | Explanations | Min | Typical | Max. | Unit |
|---|---|---|---|---|---|---|
| Flux concentrator length | FC L | | | 22 | | mm |
| Flux concentrator height | FC H | | | 20 | | mm |
| Flux concentrator thickness | FC T | | | 4 | | mm |
| Flux concentrator annular width | FC A | | | 2.5 | | mm |
| Flux concentrator inclination | angle T | | −1 | | +1 | degrees |
| Flux concentrator pole angle | angle FC | | | 60 | | degrees |
| Angle between MFS axis and field generator axis | angle MFS | | | 88 | | degrees |
| Flux concentrator material | | | | steel disks | | |
| Number of metallic elements used in the flux concentrator | | | 1 | 3 | | |
| Distance between the poles of the flux concentrator and the test object | distance | | 0.1 | | 1.1 | mm |
| Distance between the middle of the MFS coil and the test object | MFS H | | | 2 | | mm |
| Test object diameter | TO D | | | 15 | | mm |
| Number of turns in the generating coil | | | | 100 | | turns |
| Coil wire thickness | | | | 0.28 | | mm |
| Axial coil length on the flux concentrator | | | | 10 | | mm |
| Location relative to flux concentrator | | | | middle | | |
| Specified MFS coil turns | | | | 400 | | turns |
| MFS coil wire | | | | 80 | | μm |

-continued

| Specification | Symbol | Explanations | Min | Typical | Max. | Unit |
|---|---|---|---|---|---|---|
| thickness | | | | | | |
| Coil body length | | | | 6 | | mm |
| MFS coil body diameter | | | | 2 | | mm |
| MFS coil resistance | | direct current | | 10 | | Ohm |
| MFS coil manufacturer | | | | KUK | | |

Diameter of the Test Object (Example: Driveshaft)

The diameter of the test object (or driveshaft) defines (besides a couple of other parameters) the signal amplification related to the bending forces. The larger the diameter of the shaft, the smaller is the signal amplification (in relation to a constant applied bending force).

Note: The signal amplification of the active bending sensor is determined by a number of specific characteristics. When seeking to test the behavior of the sensor when the diameter (or cross-section area) is changed, all other sensor parameters must be kept constant, such as:
- identical shaft material
- identical hardening and annealing processes
- distance/gap between the test object and the sensor hardware
- magnetic flux density produced by the sensor hardware
- inductivity and driver circuit
- sensor hardware dimensions
- surface size of the two magnetic poles
- Adapted: the radius machined in the poles for adaptation to the shaft diameter A11

Figure 18A:
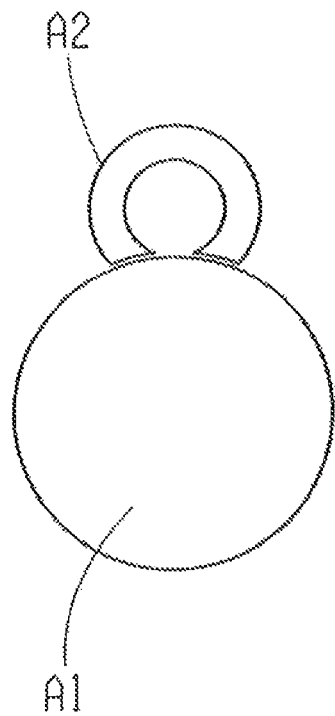
FIGS. 18a, 18b, 18c: Side views of sensor elements of which the magnetic pole surfaces are adapted for shafts of different diameters.
Figure 18B:
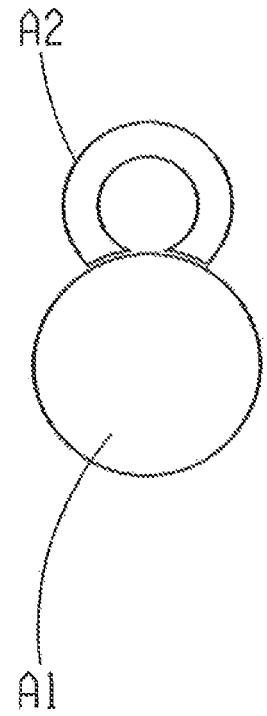
Figure 18C:
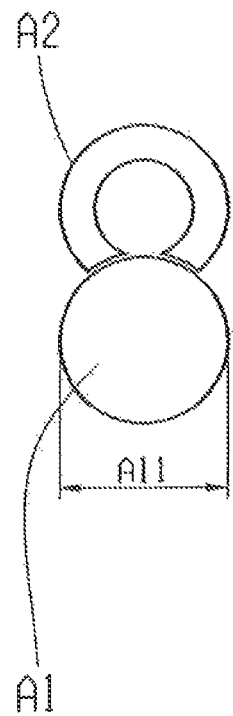

FIGS. 18a, 18b, 18c show the following, in side views 18a, 18b and 18c: one and the same sensor hardware configuration is used for carrying out this test. However, the two magnetic pole surfaces that face toward the test object have to be adapted individually for each shaft diameter. It is decisive that the "gap" (distance) between the magnet poles is kept constant, in order to leave the same "room" for the MFS coil.

Figure 19A:
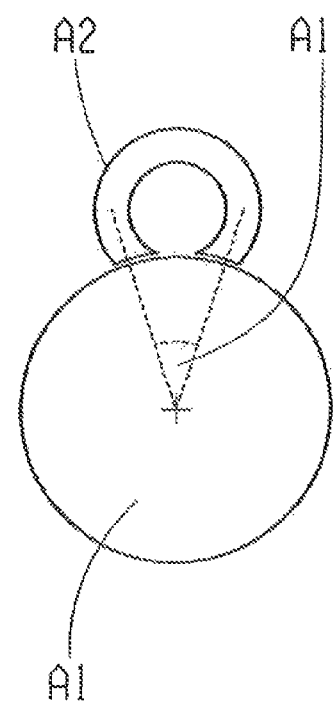
FIGS. 19a, 19b, 19c: Side views of sensor elements illustrating arc characteristic means according to the invention.
Figure 19B:
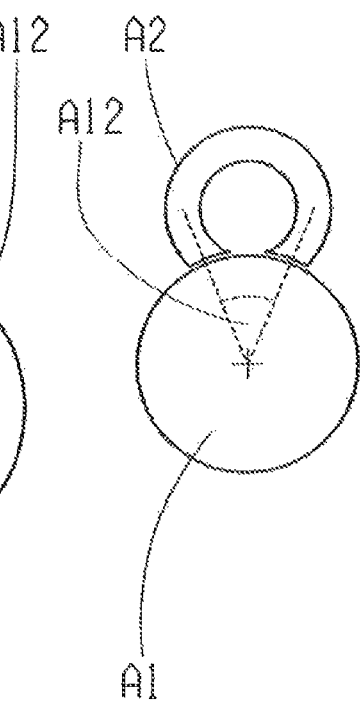
Figure 19C:
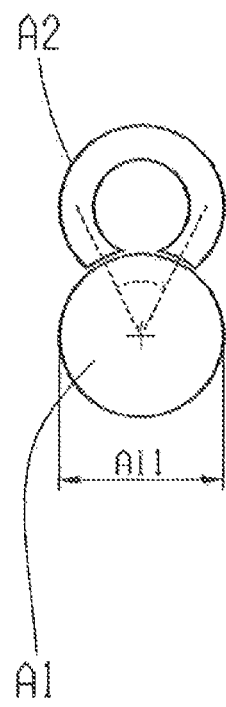

Most probably, the signal amplification of the bending sensor is also defined by the arc characteristic of the sensor hardware. Here, arc characteristic means: "The angle over which the sensor hardware covers the test object" (see FIGS. 19a, 19b, 19c showing the side views 19a, 19b and 19c).

The angle of the sensor arc A12 is different in all three of the examples illustrated above. There are two conflicting assumptions, both of them reasonable and which to a certain extent can compensate one another:
- The larger the arc angle, the greater is the signal amplification
- With a larger arc angle a larger area of the sensor surface is covered and it is easier to detect the sub-torques that distort the magnetic signal.
- The closer the magnetic poles come to a position on opposite sides of the shaft, the smaller is the sensor signal.
- In this case (when the poles are arranged on opposite sides of the shaft) the magnetic field passes almost 100% directly through the shaft material and has no effects at the surface of the shaft (on which the sensor coil is then arranged).

Figure 20A:
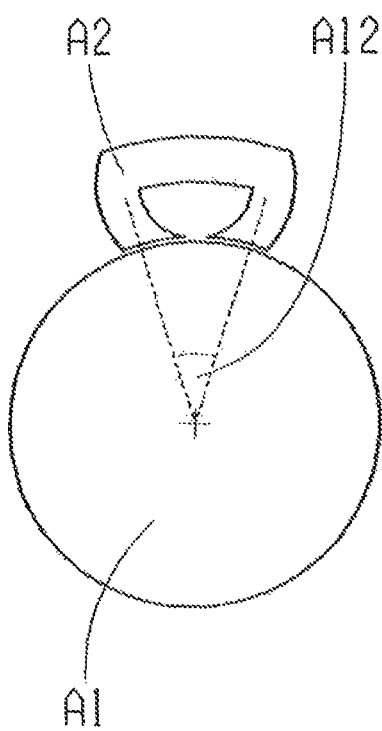
FIGS. 20a, 20b: First and second views of sensor elements illustrating changes in the structure of sensor hardware for shafts of different diameters.
Figure 20B:
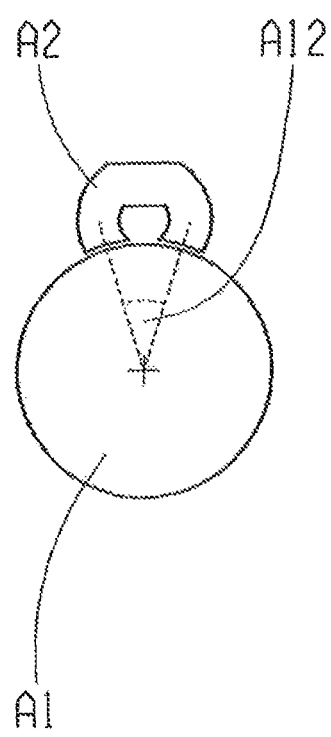

In FIGS. 20a, 20b the shaft diameter changes and the angle A12 of the arc (sensor hardware) has been kept constant. This means that the structure of the sensor hardware essentially changes for each shaft diameter.

Distance Between Shaft and Sensor

There are several design possibilities, which have been tested, in order to compensate the signal amplification change automatically when the distance between the sensor and the shaft surface changes. The simplest design option is to use a feedback coil.

Figure 21:
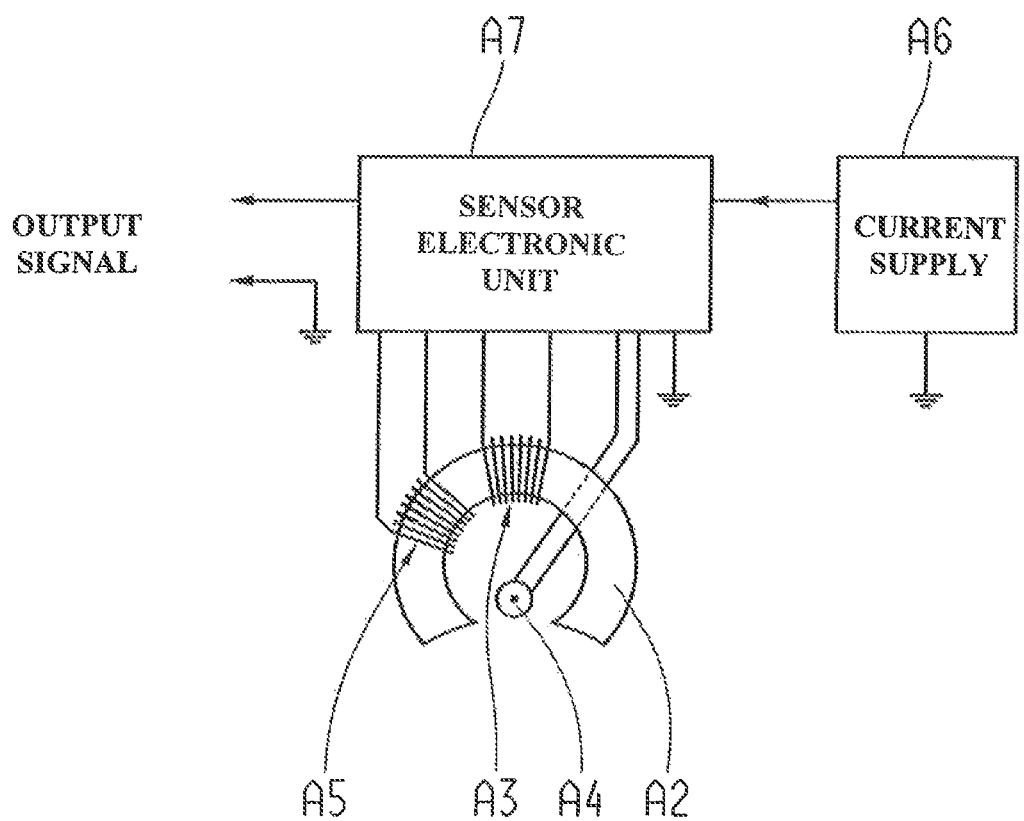
FIG. 21: Another example of a sensor element according to the invention.

Structure of the Feedback Coil:

FIG. 21 show the following: the feedback coil A5 provides accurate information about the efficiency of the sensor or when the distance between the sensor hardware and the shaft surface changes.

Flux Concentrator Material

Until now, in all the tests carried out on active bending sensors "standard" disks and clamping rings have been used as the flux concentrator. Here, the term "standard" means that a large selection of disks available via professional supply channels (Hoffman Tools) and consumer markets (Obi in Germany) have been purchased and used in the structure of the sensor.

The only criterion that has been applied for the decision of "which disk or clamping ring material can be used", was that relative to a permanent magnet held close to it, the material shows a strong reaction. Until now no tests have yet been planned or carried out to determine what sensor performance differences can be achieved when a more high-grade material such as transformer steel is used.

The reasons why no specific optimization of the flux concentrator material has been pursued, are as follows:
- The sensor performance is strongly influenced by other factors, which were the first to attract attention.
- The disks and clamping rings are perfectly shaped, which has simplified the original sensor design and saved time. The disks are perfectly symmetrical and are available in almost any desired sizes and thicknesses,
- Very low cost and ready availability.

At least five different disk and clamping ring types have been used until now, which differ in the type of the material (for example hardened spring steel, unhardened disks), and coating (none, chromium, zinc, etc.). They all showed good performance. To determine which material achieves the best results and "wherein the performance differences consist", it is necessary to purchase or to produce oneself "identically" sized and "identically" shaped flux concentrators, so that the test results can be compared with one another.

Summary:

Clearly, the choice of the flux concentrator material will influence the performance of the sensor. Since an active bending sensor can be used in a direct voltage mode or an alternating voltage mode, there are also different material characteristic requirements for each of these two operating modes. If the material chosen has a high remanence, it is NOT suitable for direct voltage operation since the flux concentrator, after it has been permanently magnetized, will show a different reaction from before that. It can be assumed that transformer steel will be a good choice of material. It too is widely available, but is expensive.

Test Object Material

At first it was assumed that the test object material should have similar quality and similar behavior (as regards its magnetostrictive properties) to those needed when magnetostrictive bending sensors are constructed. These ferromagnetic materials are slightly more expensive than "normal" steels, since they have to contain nickel, chromium or similar elements, alone or in combination.

Surprisingly, the results showed that a much larger selection of metallic materials can be used, than originally assumed. So long as a permanent magnet sticks to a test object, the active bending sensor too will function.

Residual Magnetic Fields in the Test Object

Active Sensor Operated with Direct Voltage (Static Field):

When test object materials are used which have ferromagnetic properties and can be permanently magnetized, such materials should NOT be used with an active bending sensor operated with direct voltage. The reason for this is that at the point where the active bending sensor is positioned, such a material will slowly but surely become a bar magnet (which means that the place where the active bending sensor is positioned will itself become a magnet after a time. Here, "after a time" means after a couple of seconds or after a couple of minutes).

When that happens, the signal offset of the bending sensor drifts in one or other direction and is then not stable. Conversely, it is therefore only logical that an active bending sensor operated with direct voltage is VERY sensitive to magnetic fields stored under the surface of the test object. Accordingly, before use the material of the test object must first be demagnetized.

Active Bending Sensor Operated Dynamically (with Alternating Voltage):

When the active bending sensor is operated in an alternating voltage mode (the field-generating coil is energized by a symmetrical alternating current with a defined frequency) AND standard inductors with a ferromagnetic core are used then the design of the active bending sensor is in most cases INSENSITIVE to magnetic fields stored in the test object.

"In most cases" means that cases are possible, in which the active bending sensor operated with alternating voltage is sensitive to magnetic fields stored under the surface of the test object. For example, if it is assumed that ONE magnetic point is stored in the test object (in the sensor area), and if it is further assumed that TWO sensor coils are arranged symmetrically around the shaft, then the signal produced by the magnetic point (at a rotation speed of 300 revolutions per second (equivalent to 18,000 $min^{-1}$)) will disturb the internal signal coding function of the sensor system.

Inclination of the Flux Concentrator

Figure 22A:
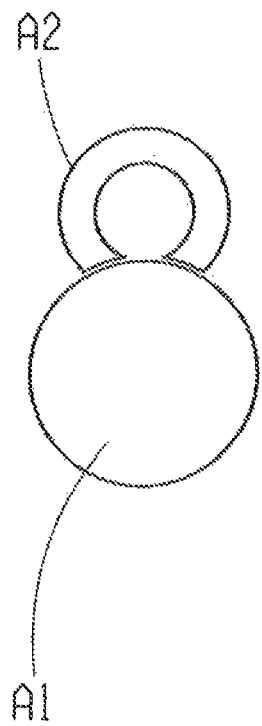
FIGS. 22a, 22b, 22c: A side view and first and second front views of a sensor element showing a magnetic flux concentrator at different inclinations.
Figure 22B:
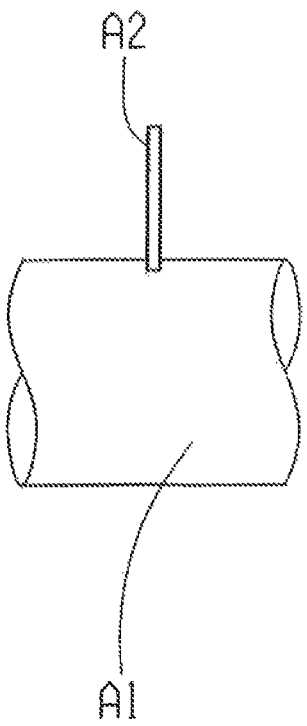
Figure 22C:
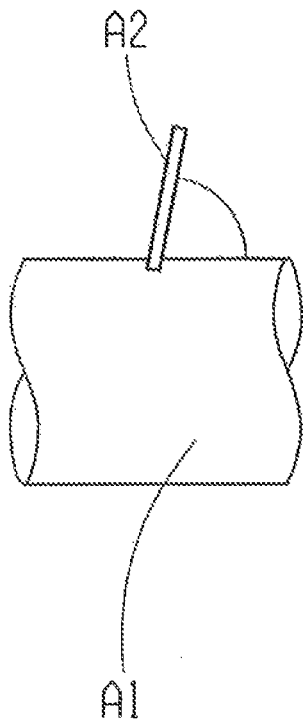

Most probably, an inclination of the flux concentrator will reduce the signal amplification (see FIGS. 22a, 22b, 22c, with the side view 22a and the front views 22b and 22c, wherein the magnetic flux concentrator A2 is inclined in FIG. 22c).

Material Thickness of the Flux Concentrator

The thickness of the flux concentrator device defines the precision with which a specific mechanical force can be selectively identified and measured. It is important that the magnetic field lines produced pass through the surface of the test object, in order to ensure a sufficient signal amplitude produced by the magnetic field sensor device. If the flux concentrator is made too thin, then the field generated by the field-generating coil produces undesired magnetic stray fields.

Figure 23:
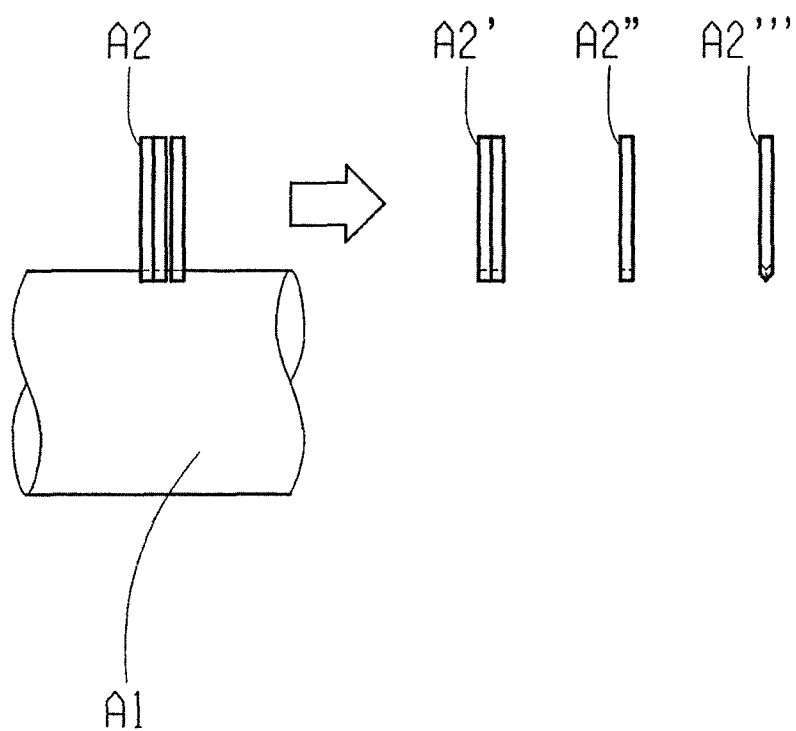
FIG. 23: A side view of a magnetic field concentrator and three alternative designs thereof.

The magnetic field concentrator A2 and the alternative designs thereof, A2', A2" and A2''', are shown in FIG. 23.

It still has to be tested and evaluated how the sensor performance changes when the flux concentrator thickness is reduced, or what effect the shape of the front parts (the two poles) has. To make the pole area very slender, the pole ends can be "pointed". The potential advantage of this is that such a structure is less sensitive to an inclination of the flux concentrator.

Flux Concentrator Profile

A mechanical structure with a "low profile" is preferred for most applications. However, great care must be taken that no sharp "corners" remain on the flux concentrator, since the magnetic field will then emerge there and produce undesired stray fields.

It is also important to ensure that the surface of the test object does not come too close to the upper end of the flux concentrator, because otherwise that part of the flux concentrator interferes with the measurement signal ("steals" the magnetic signal that should be detected and captured by the MFS device).

FIGS. 24a, 24b show a side view of the following: it is important to keep as small as possible the radial space needed by the active torque sensor, in order to accommodate that sensor in small fitting spaces. However, by reducing the radial dimensions the generating coil comes closer to the sensor coil and also closer to the test surface, which can lead to a deterioration of the sensor performance that can otherwise be achieved. The figures show a magnetic flux concentrator A2 and another alternative configuration A2''''.

INDEXES

1 Chassis component
1a Measurement fixture
1b Metallic, magnetic portion
1c Connecting strut
1d Ball bearing
1e Ball bearing
1f Weld seam
2 Housing
2a Upper housing half
2b Lower housing half
2c Cast mass
2d Projection
3 Field-generation means
3a First field-generating means
3aa Field concentrator
3b Second field-generating means
3ba Field concentrator
4 Cable
5 Detection means
5a First detection means
5b Second detection means
6a Aperture
6b Fastener
6c Fixing structure
7 Electronic means
x Distance
M Central plane
NF Neutral fiber
A1 Test object
A2 Magnetic flux concentrator
A3 Magnetic field generating coil
A4 Magnetic sensor element
A5 Signal feedback coil
A6 Current supply A7 Signal generator
A8 Filter & power driver
A9 Filter & gain
A10 Variable gain amplifier
A11 Shaft diameter
A12 Angle of the sensor arc

The invention claimed is:

1. A chassis component (1) of a machine, wherein the chassis component has a curved outer surface, the chassis component comprising:
 at least one metallic, magnetic portion of the chassis component (1b), and
 a measuring fixture (1a) for measuring forces, and the measuring fixture (1a) comprising a pair of partially annular shaped field-generators (3; 3a, b), each having a first end and a second end for producing an electromagnetic alternating field and a pair of detectors (5; 5a, b) for detecting changes of the magnetic field produced,
 the first end of each of the pair of partially annular shaped field-generators (3; 3a, b) being spaced apart from the curved outer surface of the chassis component by a first gap and the second end of each of the pair of partially annular shaped field-generators (3; 3a, b) being spaced apart from the curved outer surface of the chassis component by a second gap, and each of the pair of partially annular shaped field-generators (3; 3a, b), the first gap, the second gap, and a portion of the curved surface of the chassis component defining an internal space and a respective one of the pair of detectors (5; 5a, b) being completely located in the respective internal space,
 the pair of field-generators (3; 3a, b) and the respective pair of detectors (5; 5a, b) being arranged adjacent to, but not in direct contact with, the curved surface of the metallic, magnetic portion of the chassis component (1b) and designed to interact with the metallic, magnetic portion of the chassis component (1b) in such a manner that by way of the measuring fixture (1a), as a function of measurement signals from the pair of detectors (5; 5a, b), at least one of a force acting on and deformation of the chassis component (1) is detectable.

2. The chassis component according to claim 1, wherein the machine is a wind power generator, and the chassis component is either a shaft or a rotor blade of the wind power generator that at least one of moves and is loaded during operation.

3. The chassis component (1) according to claim 1, wherein the machine is in a vehicle and the chassis component (1) is in the form of one of the following components:
 a damper element, a piston rod of a damper element;
 a control arm;
 a connecting strut (1c);
 a hinged support;
 a stabilizer;
 a steering element, a steering rod, a steering column and a track rod.

4. The chassis component (1) according to claim 3, wherein at least one of the pair of field-generators (3; 3a, b) and the pair of detectors (5; 5a, b) is in the form of coils.

5. The chassis component (1) according to claim 3, wherein the pair of field-generators (3; 3a, b) and the pair of detectors (5; 5a, b) are arranged in fixed positions in a housing (2), the housing (2) is arranged in a fixed position on the chassis component (1), and the pair of field-generators (3; 3a, b) and the pair of detectors (5; 5a, b) are immobilized within the housing (2) by a hardened cast mass (2c).

6. The chassis component (1) according to claim 5, wherein the chassis component (1) has a fixing structure (6c) for the housing (2), the fixing structure (6c) is formed integrally with the chassis component (1) in the form of an aperture in the chassis component (1), and the fixing structure (6c) is formed by local deformation of the chassis component (1).

7. The chassis component (1) according to claim 3, wherein the chassis component (1) has at least one weld seam (1f) and at least one of the pair of field-generators (3; 3a, b) and the pair of detectors (5; 5a, b) is arranged on the chassis component (1) and is spaced from the weld seam (1f) by a distance of between approximately 30 mm and approximately 40 mm.

8. The chassis component (1) according to claim 3, wherein the pair of detectors (5; 5a, b) and the pair of field-generators (3; 3a, b) are substantially arranged in a plane and a neutral fiber (NF) of the chassis component (1) lies in the same plane.

9. The chassis component (1) according to claim 8, wherein the plane is at least approximately perpendicular to a main bending direction of the vehicle component.

10. The chassis component (1) according to claim 1, wherein the measuring fixture (1a) comprises the pair of field-generators (3; 3a, b) and the pair of detectors (5; 5a, b) and an arrangement of the pair of field-generators (3a, b) and the pair of detectors (5a, b), relative to one another, on opposite sides of the chassis component (1) is the same.

11. A chassis component (1) of a machine, wherein the chassis component has a curved outer surface, the chassis component comprising:
 at least one metallic, magnetic portion of the chassis component (1b), and
 a measuring fixture (1a) for measuring forces, and the measuring fixture (1a) comprising at least one partially annular shaped field-generator (3; 3a, b) having a first end and a second end for producing an electromagnetic alternating field and at least one detector (5; 5a, b) for detecting changes of the magnetic field produced,
 the first end of the at least one partially annular shaped field-generator (3; 3a, b) being spaced apart from the curved outer surface of the chassis component by a first gap and the second end of the at least one partially annular shaped field-generator (3; 3a, b) being spaced apart from the curved outer surface of the chassis component by a second gap,
 the at least one partially annular shaped field-generator (3; 3a, b), the first gap, the second gap, and a portion of the curved surface of the chassis component defining an internal space and the at least one detector (5; 5a, b) being located completely within the internal space,
 the at least one partially annular shaped field-generator (3; 3a, b) and the at least one detector (5; 5a, b) being arranged adjacent to, but not in direct tact with, the curved surface of the metallic, magnetic portion of the chassis component (1b) and designed to interact with the metallic, magnetic portion of the chassis component (1b) in such a manner that by way of the measuring fixture (1a), as a function of measurement signals from the at least one detector (5; 5a, b), at least one of a force acting on and deformation of the chassis component (1) is detectable,
 wherein the at least one partially annular shaped field-generator (3; 3a, b) comprises a pair of partially annular shaped field-generators (3; 3a, b) and the at least one detector (5; 5a, b) comprises a pair of detectors (5; 5a, b), the chassis component (1) has at least one weld seam (1f) and at least one of the pair of at least one partially annular shaped field-generators (3; 3a, b) and the pair of detectors (5; 5a, b) is arranged on the chassis component (1) and is spaced from the weld seam (1f) by a distance of between approximately 30 mm and approximately 40 mm.

12. A chassis component (1) of a machine, the chassis component comprising:
- at least one metallic, magnetic portion of the chassis component (1b), wherein the chassis component has a curved outer surface, and
- a measuring fixture (1a) for measuring forces, and the measuring fixture (1a) comprising at least one partially annular shaped field-generator (3; 3a, b) having a first end and a second end for producing an electromagnetic alternating field and at least one detector (5; 5a, b) for detecting changes of the magnetic field produced, the first end of the at least one partially annular shaped field-generator (3; 3a, b) being spaced apart from the curved outer surface of the chassis component by a first gap and the second end of the at least one partially annular shaped field-generator (3; 3a, b) being spaced apart from the curved outer surface of the chassis component by a second gap,
- the at least one partially annular shaped field-generator (3; 3a, b), the first gap, the second gap, and a portion of the curved surface of the at least one metallic, magnetic portion of the chassis component (1b) together defining a space and the at least one detector (5; 5a, b) being located completely within the space,
- the at least one partially annular shaped field-generator (3; 3a, b) and the at least one detector (5; 5a, b) being arranged adjacent to, but not in direct contact with, the curved surface of the metallic, magnetic portion of the chassis component (1b) and designed to interact with the metallic, magnetic portion of the chassis component (1b) in such a manner that by way of the measuring fixture (1a), as a function of measurement signals from the at least one detector (5; 5a, b), at least one of a force acting on and deformation of the chassis component (1) is detectable.

* * * * *